(12) United States Patent
Newman

(10) Patent No.: US 11,431,114 B2
(45) Date of Patent: Aug. 30, 2022

(54) ENCLOSED CONNECTION SYSTEMS FOR FORMING AN ENCLOSED CONNECTION BETWEEN CONDUCTORS, AND METHODS INCLUDING SAME

(71) Applicant: TE Connectivity Services GmbH, Schaffhausen (CH)

(72) Inventor: John Anthony Newman, Garner, NC (US)

(73) Assignee: TE CONNECTIVITY SOLUTIONS GMBH, Scaffhausen (CH)

( * ) Notice: Subject to any disclaimer, the term of this patent is extended or adjusted under 35 U.S.C. 154(b) by 0 days.

(21) Appl. No.: 17/153,362

(22) Filed: Jan. 20, 2021

(65) Prior Publication Data
US 2021/0257749 A1    Aug. 19, 2021

Related U.S. Application Data

(60) Provisional application No. 62/976,390, filed on Feb. 14, 2020.

(51) Int. Cl.
| H01R 4/38 | (2006.01) |
| H01R 4/44 | (2006.01) |
| H01R 4/70 | (2006.01) |
| H01R 11/11 | (2006.01) |
| H02G 15/10 | (2006.01) |

(52) U.S. Cl.
CPC .............. *H01R 4/44* (2013.01); *H01R 4/70* (2013.01); *H01R 11/11* (2013.01); *H02G 15/10* (2013.01)

(58) Field of Classification Search
CPC ... H01R 4/44; H01R 4/70; H01R 4/38; H01R 4/28; H01R 11/11; H02G 15/10

USPC .......................................................... 439/775
See application file for complete search history.

(56) References Cited

U.S. PATENT DOCUMENTS

| 2,164,381 A | 7/1939 | Bradley |
| 2,219,846 A | 10/1940 | Meyer |
| 2,858,522 A | 10/1958 | Wengen et al. |

(Continued)

FOREIGN PATENT DOCUMENTS

| CN | 1298565 C | 2/2007 |
| CN | 1933267 A | 3/2007 |

(Continued)

OTHER PUBLICATIONS

"4 POS Block Ass'y" Tyco Electronics Brasil LTDA (1 page) (Apr. 28, 2009).

(Continued)

*Primary Examiner* — Harshad G Patel

(57) ABSTRACT

An enclosed connection system for mechanically and electrically connecting first and second cables each including an elongate electrical conductor covered by an insulation layer, includes an electrical connector, an enclosure, and a protective end cap. The electrical connector is configured to form a connection with the first and second cables wherein the conductors of the first and second cables are electrically connected by the electrical connector. The enclosure is configured to receive and cover the connection and to protect the electrical connector. The enclosure includes a plurality of enclosure ports each configured to receive a cable. The protective end cap is configured to selectively cover at least a selected one of the enclosure ports.

23 Claims, 27 Drawing Sheets

(56) References Cited

U.S. PATENT DOCUMENTS

| | | |
|---|---|---|
| 2,953,771 A | 9/1960 | Kussy |
| 3,020,260 A | 2/1962 | Nelson |
| 3,094,366 A | 6/1963 | Harmon, Jr. |
| 3,112,148 A | 11/1963 | Wochner |
| 3,147,338 A | 9/1964 | Ekvall et al. |
| 3,223,776 A | 12/1965 | Piasecki |
| 3,325,591 A * | 6/1967 | Wahl ................ H01R 4/5083 174/138 F |
| 3,325,776 A | 6/1967 | Eppler |
| 3,372,361 A | 3/1968 | Wengen |
| 3,425,028 A | 1/1969 | Neaderland |
| 3,484,541 A | 12/1969 | Campbell |
| 3,688,247 A | 8/1972 | Prodel |
| 3,715,459 A * | 2/1973 | Hoffman ............ H02G 15/113 174/138 F |
| 3,848,956 A | 11/1974 | Kraft |
| 3,876,279 A | 4/1975 | Underwood |
| 3,879,575 A | 4/1975 | Dobbin et al. |
| 4,070,082 A | 1/1978 | Werner |
| 4,247,159 A | 1/1981 | Fruchard |
| 4,369,284 A | 1/1983 | Chen |
| 4,399,592 A | 8/1983 | Chopp, Jr. et al. |
| 4,427,253 A | 1/1984 | Smith et al. |
| 4,451,696 A | 5/1984 | Beinhaur |
| 4,550,965 A | 11/1985 | Izraeli |
| 4,600,261 A | 7/1986 | Debbaut |
| 4,610,738 A | 9/1986 | Jervis |
| 4,634,207 A | 1/1987 | Debbaut |
| 4,680,233 A | 7/1987 | Camin et al. |
| 4,716,183 A | 12/1987 | Gamarra et al. |
| 4,777,063 A | 10/1988 | Dubrow et al. |
| 4,849,580 A | 7/1989 | Reuter |
| 4,852,646 A | 8/1989 | Dittmer et al. |
| 4,859,809 A | 8/1989 | Jervis |
| 4,880,676 A | 11/1989 | Puigcerver et al. |
| 4,909,756 A | 3/1990 | Jervis |
| 4,942,270 A | 7/1990 | Gamarra |
| 5,015,198 A | 5/1991 | Delin |
| 5,079,300 A | 1/1992 | Dubrow et al. |
| 5,099,088 A | 3/1992 | Usami et al. |
| 5,129,839 A * | 7/1992 | VanSkiver ......... H01R 13/6392 439/367 |
| 5,140,746 A | 8/1992 | Debbaut |
| 5,174,782 A | 12/1992 | Bogiel et al. |
| 5,177,143 A | 1/1993 | Chang et al. |
| 5,347,084 A | 9/1994 | Roney et al. |
| 5,357,057 A | 10/1994 | Debbaut |
| 5,397,859 A | 3/1995 | Robertson et al. |
| 5,429,530 A | 7/1995 | Zander et al. |
| 5,498,172 A * | 3/1996 | Noda ................... H01R 12/616 439/404 |
| 5,525,073 A | 6/1996 | Sampson |
| 5,561,269 A | 10/1996 | Robertson et al. |
| 5,569,882 A * | 10/1996 | Yokoyama ......... H02G 15/003 174/138 F |
| 5,594,210 A | 1/1997 | Yabe |
| 5,722,850 A | 3/1998 | White |
| 5,763,835 A * | 6/1998 | Huynh-Ba ............ G02B 6/4446 174/138 F |
| 5,828,005 A | 10/1998 | Huynh-Ba et al. |
| 5,842,893 A | 12/1998 | De |
| 5,911,604 A | 6/1999 | Chadbourne |
| 5,916,001 A | 6/1999 | Chadbourne |
| 5,944,564 A | 8/1999 | Chadbourne et al. |
| 5,944,565 A | 8/1999 | Chadbourne et al. |
| 6,045,414 A | 4/2000 | DeFrance |
| 6,099,344 A | 8/2000 | Chadbourne |
| 6,106,323 A | 8/2000 | Elisei et al. |
| 6,120,334 A | 9/2000 | Timsit et al. |
| 6,135,804 A | 10/2000 | Lux |
| 6,152,786 A | 11/2000 | Perrin et al. |
| 6,169,250 B1 | 1/2001 | Bolcato |
| 6,246,003 B1 | 6/2001 | Ferris et al. |
| 6,265,665 B1 * | 7/2001 | Zahnen .................. H01R 4/70 174/70 A |
| 6,309,261 B1 | 10/2001 | Chadbourne |
| 6,322,402 B1 | 11/2001 | Chadbourne et al. |
| 6,333,463 B1 | 12/2001 | Bukovnik et al. |
| 6,517,391 B1 | 2/2003 | Chadbourne |
| 6,648,671 B2 | 11/2003 | Suzuki et al. |
| 6,668,427 B2 | 12/2003 | Bulanda et al. |
| 6,692,292 B2 | 2/2004 | Huiskamp et al. |
| 6,780,044 B1 | 8/2004 | Sawyer et al. |
| 7,044,761 B2 | 5/2006 | Sokol et al. |
| 7,104,832 B2 | 9/2006 | Campbell et al. |
| 7,138,580 B2 | 11/2006 | Boutin |
| 7,182,653 B1 | 2/2007 | Hoxha |
| 7,309,263 B2 | 12/2007 | Copper et al. |
| 7,341,479 B2 | 3/2008 | Boutin |
| 7,354,284 B2 * | 4/2008 | Aime .................. H01R 13/443 439/148 |
| 7,417,190 B2 * | 8/2008 | Pini .................... H02G 15/003 174/76 |
| 7,431,611 B2 * | 10/2008 | King, Jr. ................ H02G 3/32 439/369 |
| 7,432,445 B2 * | 10/2008 | Bird .................... H02G 15/113 174/92 |
| 7,550,672 B2 | 6/2009 | Chadbourne et al. |
| 7,686,661 B2 * | 3/2010 | Shrum ................ H02G 15/113 439/781 |
| 7,695,306 B2 | 4/2010 | Chiba |
| 7,845,990 B2 * | 12/2010 | Shrum ............... H01R 13/5216 439/781 |
| 7,950,956 B2 | 5/2011 | Hiner et al. |
| 7,993,169 B1 | 8/2011 | Hoxha |
| 8,016,622 B2 | 9/2011 | Battle |
| 8,063,306 B2 * | 11/2011 | Zhong ................ H02G 15/046 174/92 |
| 8,227,696 B2 | 7/2012 | Pullium et al. |
| 8,444,431 B1 | 5/2013 | La |
| 8,748,741 B2 | 6/2014 | OSullivan et al. |
| 9,059,579 B2 | 6/2015 | Pullium et al. |
| 9,287,673 B2 | 3/2016 | Galla et al. |
| 10,840,615 B2 * | 11/2020 | Newman ............... H01R 13/582 |
| 2007/0270046 A1 | 11/2007 | Copper et al. |
| 2008/0050987 A1 | 2/2008 | Copper et al. |
| 2008/0236863 A1 | 2/2008 | Hiner et al. |
| 2008/0254664 A1 | 10/2008 | Hiner et al. |
| 2010/0122829 A1 * | 5/2010 | Pullium, III ......... H02G 15/003 174/91 |
| 2013/0130538 A1 | 5/2013 | La Salvia |

FOREIGN PATENT DOCUMENTS

| | | |
|---|---|---|
| CN | 101170247 A | 4/2008 |
| CN | 201111309 Y | 9/2008 |
| CN | 101308959 A | 11/2008 |
| CN | 203707359 U | 7/2014 |
| EP | 0409444 A2 | 1/1991 |
| EP | 1139496 A2 | 10/2001 |
| EP | 1760856 A1 | 3/2007 |
| EP | 1885025 A2 | 2/2008 |
| EP | 2360790 A1 | 8/2011 |
| EP | 2808966 A1 | 12/2014 |
| FR | 2414800 A1 | 8/1979 |
| FR | 2901415 A1 | 11/2007 |
| GB | 1260902 A | 1/1972 |
| GB | 2034538 A | 6/1980 |
| GB | 2219442 A | 12/1989 |
| GB | 2358293 A | 7/2001 |
| JP | H0718357 A | 1/1995 |
| JP | 2002056922 A | 2/2002 |
| JP | 2009148010 A | 7/2009 |
| WO | 9623007 A1 | 8/1996 |
| WO | 9705671 A1 | 2/1997 |
| WO | 0067354 A1 | 11/2000 |
| WO | 2009011812 A2 | 1/2009 |

(56) References Cited

FOREIGN PATENT DOCUMENTS

| WO | 2015082674 A2 | 6/2015 |
|---|---|---|
| WO | 2020006238 A1 | 1/2020 |

OTHER PUBLICATIONS

"6 POS Block Ass'y" Tyco Electronics Brasil LTDA (1 page) (May 5, 2009).
"8 POS Block Ass'y" Tyco Electronics Brasil LTDA (1 page) (May 11, 2009).
"CDP Conector Derivacao Perfurante Insulated Piercing Connector" Intelli-Industria de Terminals Eletricos Ltda (2 pages) (2010).
"Conector Perfurante NFC 33 020" Incesa (2 pages) (Date unknown but admitted prior art).
"DCNL—Insulated Piercing Connectors" Cavanna Group (2 pages) (Date unknown but admitted prior art).
"Electric Cable Fittings, Insulation Piercing Connector (IPC Connector)" Zhejiang Tianhong Electric Power Fitting Co. Ltd., Retrieved from URL: http://www.powerfittings.com/1-1-insulation-piercing.html (1 page) (Retrieved on Nov. 21, 2011).
"Gel H-Frame Closure—1000V (GHFC)" TE Connectivity Corporation (2 pages) (Oct. 2014).
"Grounding Connector, for All Electrical Grounding" Sicame Group (4 pages) (Date unknown but admitted prior art).
"Ilsco Insulation Piercing Connectors" Munro Electrical Supplies, Retrieved from URL: http://www.munroelectric.com/catalog/ilsco/insulation.html (1 page) (Retrieved on Nov. 21, 2011).
"Insulation piercing connector for customer service information" Tyco Electronics Simel S.A.S.—Energy Division (2 pages) (Mar. 2002).
"Insulation piercing connector for main to main connection" Tyco Electronics Simel S.A.S.—Energy Division (2 pages) (Mar. 2002).
"Insulation Piercing Connectors for insulated overhead lines" Tyco Electronics SIMEL S.A.S. (2 pages) (Mar. 2003).
"Insulation Piercing Connectors for street lighting applications" Tyco Electronics SIMEL S.A.S.—Energy Division (1 page) (Jul. 26, 2004).
"Insulation Piercing Connectors—IPC" Galvin Industries, Inc., Retrieved from URL: http://www.galvanelectrical.com/catalog/insulationPiercingConnectors.asp (1 page) (Retrieved on Nov. 21, 2011).
"Introducing LV Smart Ring Connector SRC4-70/150-10/10/70" Tyco Electronics Simel S.A. (2 pages) (Sep. 2012).
"IRC Insulated Piercing Connector" Yueqing Zhicheng Electrical Equipment Co., Ltd., Retrieved from URL: http://ceexinyu.en.made-in-china.com/product/YMjnZCQvfLVh/China-IPC-Insulated-Piercing-Connector.html (1 page) (Retrieved on Nov. 21, 2011).
"IPC with 4 POS Block" Tyco Electronics Brasil LTDA (1 page) (Apr. 29, 2009).
"IPC with 6 POS Block" Tyco Electronics Brasil LTDA (1 page) (May 7, 2009).
"IPC with 8 POS Block" Tyco Electronics Brasil LTDA (1 page) (May 7, 2009).
"IPC-Insulation Piercing Connectors for Aerial Bundle Cable" EC21 Global B2B Marketplace, Retrieved from URL: http://www.ec21.com/product-details/IPC-Insulation-Piercing-Connectors-for--4875553.html (3 pages) (Retrieved on Nov. 21, 2011).
"KZ y JZ Conectores Perforantes de Aislamiento IPC" Tyco Electronics Brasil S.A. (2 pages) (Date unknown but admitted prior art).
"Low Voltage Insulated Overhead Lines (LV ABC)" Tyco Electronics Simel S.A. Energy Division (12 pages) (Date unknown but admitted prior art).
"Matèriels de Raccordement et d'isolation our rèseaux" Tyco Electronics, Edition 07/04 (3 pages) (Nov. 2007).
"New Improved Product MSC Series Multiple Service Conductor" Sicame Australia Ply Ltd. 15(6) (3 pages) (Sep. 5, 2008).
"Service Insulation Piercing Connectors for Insulated Overhead Lines: P2X95 Mk2" Tyco Electronics SIMEL S.A.S. (1 page) (Apr. 20, 2009).
"Stainless Steel Ball Lock Ties" Raychem RPG (2 pages) (Oct. 22, 2013).
"TE Connectivity Product KZ EP" TE Connectivity (1 page) (Oct. 21, 2014).
"TE Connectivity Product LV Smart Ring Connector" TE Connectivity (1 page) (Oct. 21, 2014).
Extended European Search Report corresponding to European Application No. 21156843.1 (7 pages) (dated Jul. 5, 2021).

* cited by examiner

ENCLOSED CONNECTION SYSTEMS FOR FORMING AN ENCLOSED CONNECTION BETWEEN CONDUCTORS, AND METHODS INCLUDING SAME

RELATED APPLICATION(S)

The present application claims the benefit of and priority from U.S. Provisional Patent Application No. 62/976,390 filed Feb. 14, 2020, the disclosure of which is incorporated herein by reference in its entirety.

FIELD OF THE INVENTION

The present invention relates to connectors and methods for forming connections and, more particularly, to connection enclosures and methods for connecting elongate electrical conductors.

BACKGROUND OF THE INVENTION

Electrical conductors often must be terminated or joined in various environments, such as underground or overhead. Such conductors may be, for example, high voltage electrical distribution or transmission lines. In order to form such connections, a connector may be employed. For example, in electrical power systems, it is occasionally necessary to tap into an electrical power line. One known system for tapping into an electrical power line is to use a tap connector for electrically connecting a main line electrical cable to an end of a tap line electrical conductor.

Insulation piercing (IP) connectors are commonly used to form mechanical and electrical connections between insulated cables. Typically, an IP connector includes metal piercing blades with sets of teeth on either end thereof. The piercing blades are mounted in housing members (e.g., along with environmental sealing components). The housing members are clamped about the insulated main and tap cables so that one set of teeth of a piercing blade engages the main cable and the other set of teeth of the piercing blade engages the tap cable. The teeth penetrate the insulation layers of the cables and make contact with the underlying conductors, thereby providing electrical continuity between the conductors through the piercing blade.

SUMMARY OF THE INVENTION

According to some embodiments, an enclosed connection system for mechanically and electrically connecting first and second cables each including an elongate electrical conductor covered by an insulation layer, includes an electrical connector, an enclosure, and a protective end cap. The electrical connector is configured to form a connection with the first and second cables wherein the conductors of the first and second cables are electrically connected by the electrical connector. The enclosure is configured to receive and cover the connection and to protect the electrical connector. The enclosure includes a plurality of enclosure ports each configured to receive a cable. The protective end cap is configured to selectively cover at least a selected one of the enclosure ports.

According to some embodiments, a method for forming an enclosed connection assembly about first and second cables each including an elongate electrical conductor covered by an insulation layer, includes: connecting the first and second cables with an electrical connector to form a connection wherein the conductors of the first and second cables are electrically connected by the electrical connector; enclosing the connection in an enclosure to protect the electrical connector, wherein the enclosure includes a plurality of enclosure ports each configured to receive a cable; and covering at least a selected one of the enclosure ports with a protective end cap.

According to some embodiments, an enclosed connection assembly includes first and second cables, an electrical connector, an enclosure, and a protective end cap. The first and second cables each include an elongate electrical conductor covered by an insulation layer. The electrical connector forms a connection with the first and second cables wherein the conductors of the first and second cables are electrically connected by the electrical connector. The enclosure receives and covers the connection to protect the electrical connector. The enclosure includes a plurality of enclosure ports each configured to receive a cable. The protective end cap covers at least a selected one of the enclosure ports.

DESCRIPTION OF EMBODIMENTS OF THE INVENTION

Figure 1:
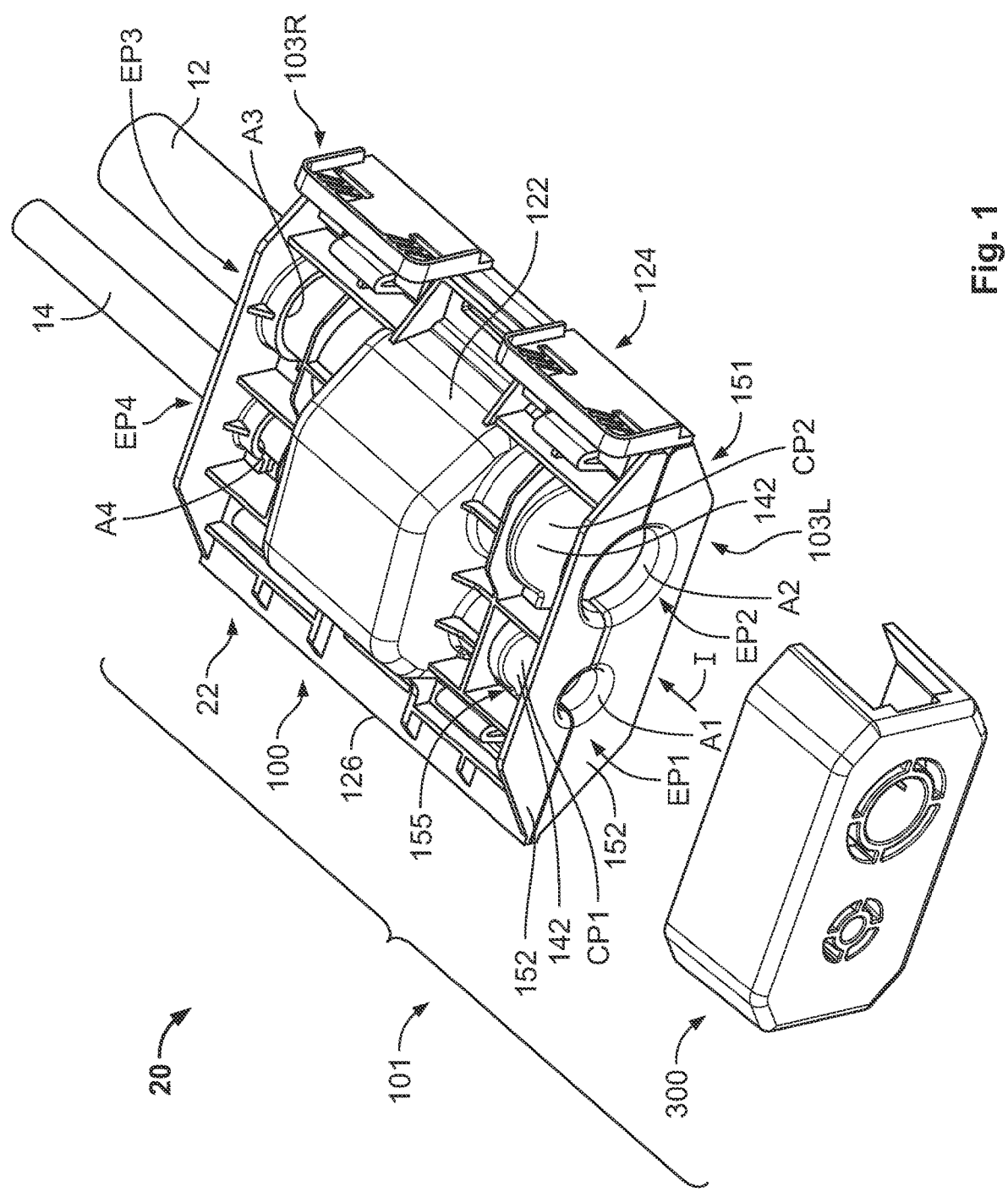
FIG. 1 is a perspective view of an enclosed connection system according to some embodiments, wherein a protective end cap forming a part of the enclosed connection system is not yet mounted on an enclosure assembly of the enclosed connection system.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

With reference to the figures, an enclosed connection system 20 according to embodiments of the present invention may be used to form an enclosed and protected connection assembly 24. The enclosed connection system 20 includes an insulation piercing connector 200 (which may be referred to herein as an IPC, IP connector, or IPC connector), and an enclosure system 101. The enclosure system 101 includes an enclosure or enclosure assembly 100, and a protective end cap 300. The connector 200 can be used to form a connection 22 (FIG. 12) including a pair of elongate conductor cables 12, 14 (e.g., electrical power lines) mechanically and electrically coupled by the connector 200. Generally, and as described in more detail below, a driver 26 (FIG. 14) may be used to secure the connector 200 on the cables 12, 14. The enclosure assembly 100 according to embodiments of the present invention may be installed on and surround the connection 22 to form the enclosed connection assembly 24. The protective end cap 300 is then installed on the enclosure assembly 100 to secure the enclosure assembly 100 from unintended intrusion.

The connector 200 is a multi-cable insulation piercing connector. The connector 200 may be adapted for use as a splice or tap connector for connecting an elongate electrical tap or feed cable 14 to an elongate main cable 12 of a utility power distribution system, for example. The connected cables 12, 14 may be other combinations of cables such as spliced cables.

Figure 4:
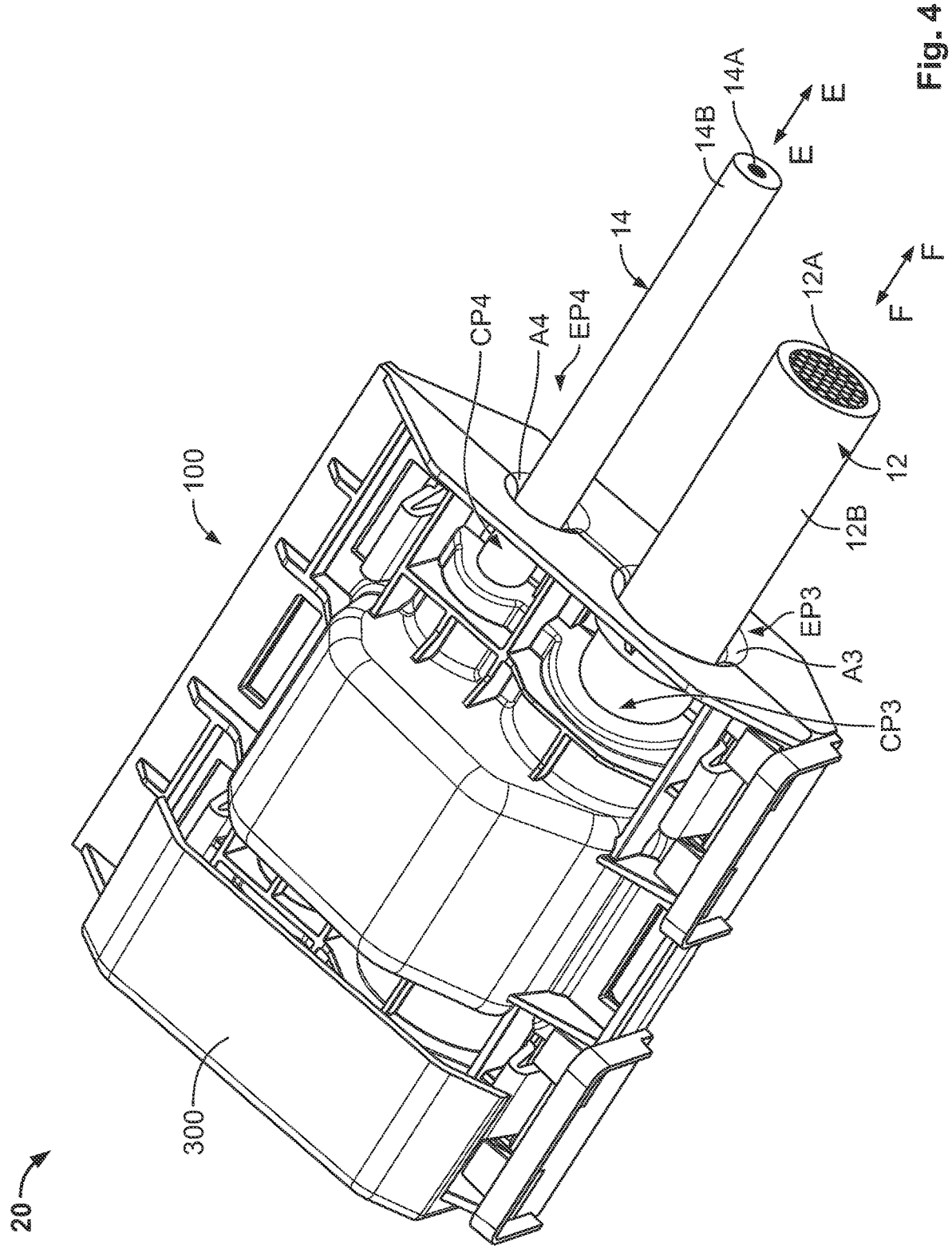
FIG. 4 is a top perspective view of the enclosed connection assembly of FIG. 2.
Figure 5:
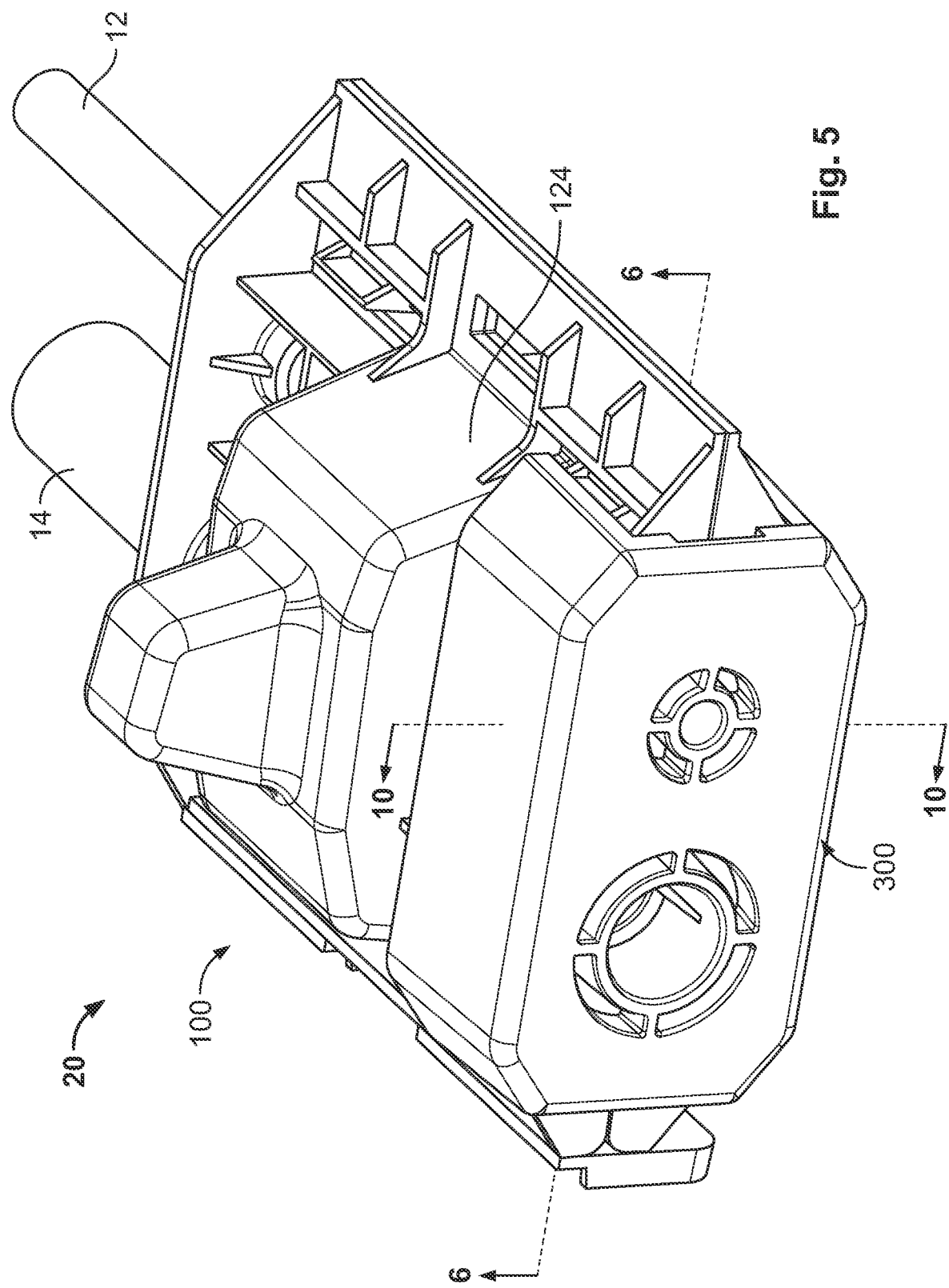
FIG. 5 is a bottom perspective view of the enclosed connection assembly of FIG. 2.

With reference to FIG. 4, the second cable 14 may be an electrically conductive metal high, medium or low voltage cable or line having a generally cylindrical form in an exemplary embodiment. The first cable 12 may also be a generally cylindrical high, medium or low voltage cable line. The cable 14 includes a metal electrical conductor 14A surrounded by an insulation layer 14B. The cable 12 includes a metal electrical conductor 12A surrounded by an insulation layer 12B. One or more of the conductors 12A, 14A may be formed of multiple strands (e.g., parallel or twisted strands) as illustrated in the figures, or may be solid cylindrical conductors (solid wire). Multi-strand conductors may be easier to handle with better bending characteristics. Suitable materials for the conductors 12A, 14A may include aluminum or copper. The insulation layers 12B, 14B may be formed of a polymeric material such as PVC, polypropylene, polyethylene, or cross-linked polyethylene. The conductor 14A and the conductor 12A may be of the same wire gauge or different wire gauge in different applications and the connector 200 is adapted to accommodate a range of wire gauges for the conductor 14A and the conductor 12A. In some embodiments, the conductor 12A has a larger cross-sectional diameter than the conductor 14A. The cable 12 has a lengthwise axis E-E and the cable 14 has a lengthwise axis F-F.

When installed on the first cable 12 and the second cable 14, the connector 200 provides electrical connectivity between the conductor 12A and the conductor 14A. This connection may be used to feed electrical power from the main conductor 12A to the tap conductor 14A in, for example, an electrical utility power distribution system. Or the connection may be used to feed electrical power to the main conductor 12A from a feed conductor 14A in an electrical power generation system, for example. The power distribution or generation system may include a number of main cables of the same or different wire gauge, and a number of tap or feed cables of the same or different wire gauge.

Figure 14:
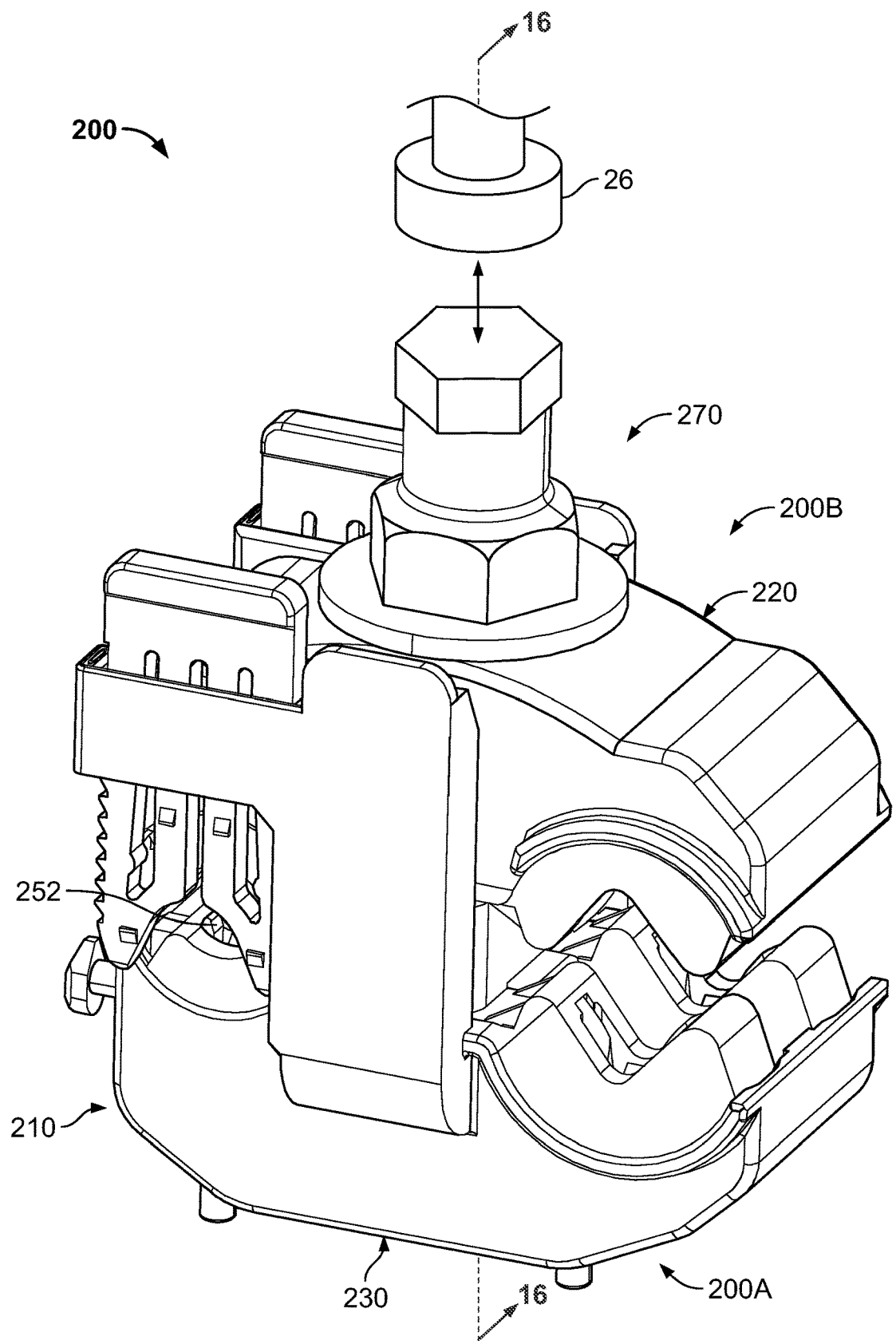
FIG. 14 is a top perspective view of an insulation piercing connector forming a part of the enclosed connection system of FIG. 1.
Figure 15:
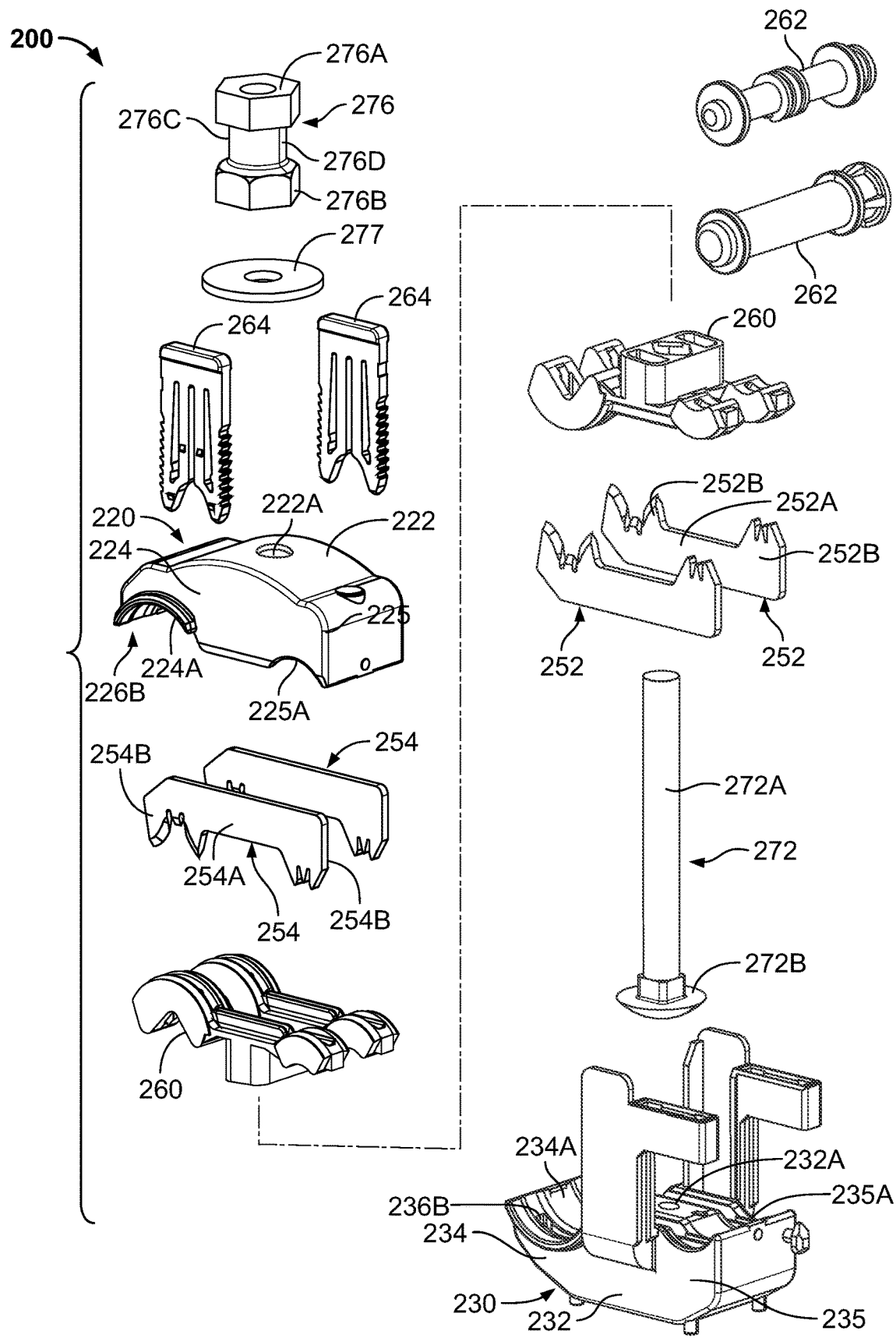
FIG. 15 is an exploded, top perspective view of the insulation piercing connector of FIG. 14.
Figure 16:
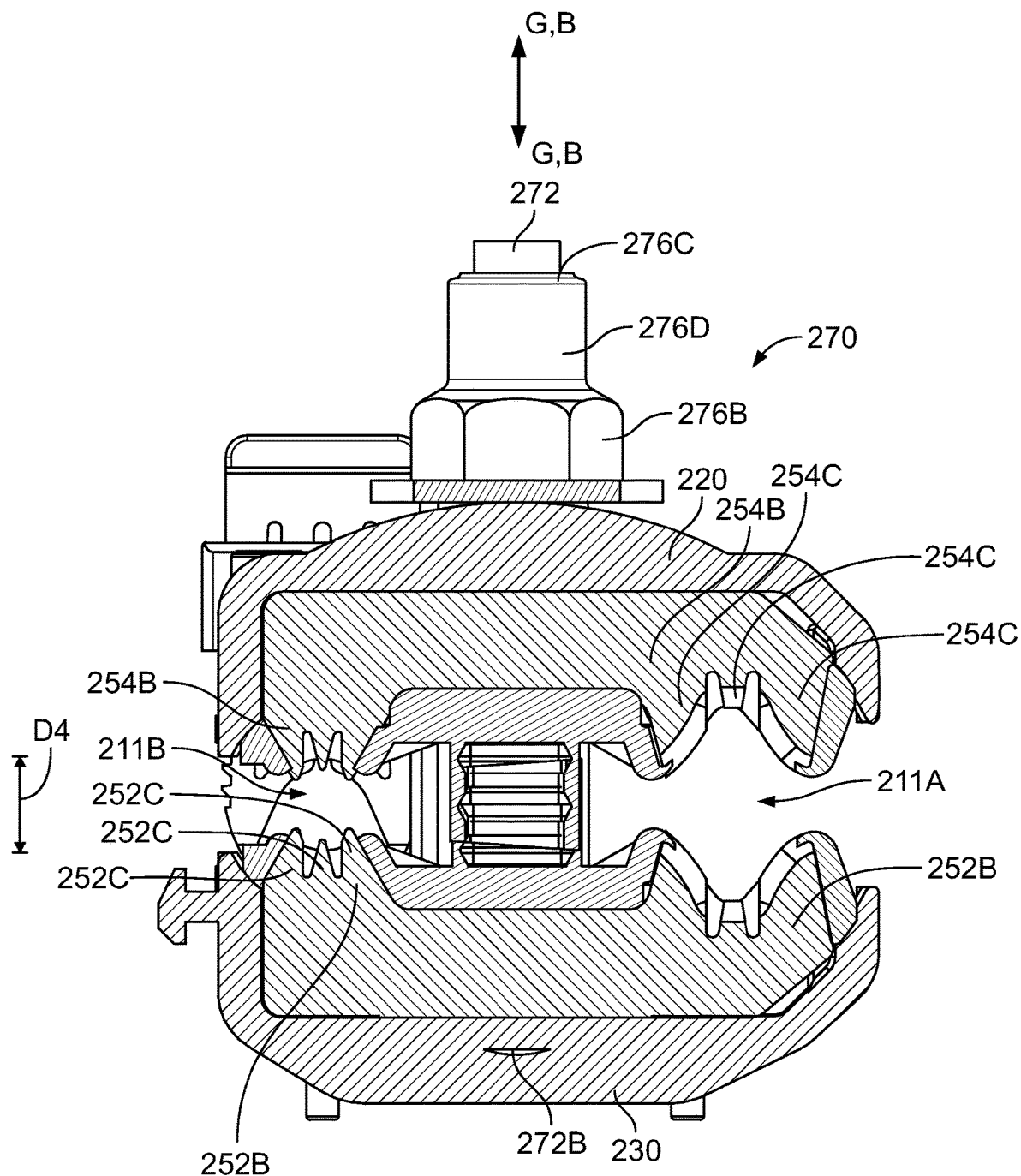
FIG. 16 is a cross-sectional view of the insulation piercing connector of FIG. 14 taken along the line 16-16 of FIG. 14.

With reference to FIGS. 14-16, the connector 200 includes a connector body assembly 210, a first pair of blade members 252 (hereinafter, the "lower blade members"), a second pair of blade members 254 (hereinafter, the "upper blade members"), seal members 260, cable end caps 262, end cap retainers 264 and a clamping or compression mechanism 270. The connector 200 has a longitudinal axis G-G.

The connector body assembly 210 includes a first or upper body member 220, and a second or lower body member 230.

The upper body member 220 includes a support portion 222 and a pair of laterally opposed legs or jaw portions 224, 225 extending laterally from the support portion 222 with respect to the connector axis G-G. The support portion 222 includes a bore 222A. The jaw portion 224 includes a cable groove or seat 224A. The jaw portion 225 includes a cable groove or seat 225A. The jaw portion 224 further includes, in the cable seat 224A, a pair of blade slots or seats 224B. The jaw portion 225 further includes, in the cable seat 225A, a pair of blade slots or seats 226B.

The lower body member 230 includes a support portion 232 and a pair of laterally opposed legs or jaw portions 234, 235 extending laterally from the support portion 232 with respect to the connector axis G-G. The support portion 232 includes a bore 232A. The jaw portion 234 includes a cable groove or seat 234A. The jaw portion 235 includes a cable groove or seat 235A. The jaw portion 234 further includes, in the cable seat 234A, a pair of blade slots or seats 234B. The jaw portion 235 further includes, in the cable seat 235A, a pair of blade slots or seats 236B.

The jaw portion 224 and the jaw portion 234 define a first or main side cable receiving slot 211A therebetween. The jaw portion 225 and the jaw portion 235 define a second or tap side cable receiving slot 211B therebetween.

The body members 220, 230 may be formed of any suitable material. According to some embodiments, the body members 220, 230 are formed of a polymeric material. In some embodiments, the polymeric material is selected from the group consisting of polyamide (PA) 6.6, PA 6.6 reinforced with glass fibers or talc, polycarbonate, or polycarbonate blend. The body members 220, 230 may be formed using any suitable technique. According to some embodiments, the body members 220, 230 are molded. According to some embodiments, the each of the body members 220, 230 is monolithic and unitarily formed.

The compression mechanism 270 includes a bolt 272, and a torque control member in the form of a nut 276. A washer 277 may be provided between the nut 276 and the upper body member 220. However, other types of compression mechanisms may be used for the compression mechanism 270. For example, the compression mechanism may include an inclined surface device operable to provide mechanical advantage, for example.

The bolt 272 may be a carriage bolt and includes a threaded shank 272A, and a head 272B.

In some embodiments and as shown, the nut 276 is a shear nut including a shear head 276A, a base portion 276B, a shear or breakaway section 276C coupling the portions 276A and 276B, and a tubular, internally threaded connecting section 276D extending from the base portion 276B to the breakaway section 276C.

The bolt 272 extends through the bores 222A, 232A and is axially constrained by the bolt head 272B and the body member 230. The nut 276 is rotatably mounted on the bolt 272 and is axially constrained by the body member 220. The bores 222A, 232A may be round, or elongated, so that the upper connector body can rock as it is torqued down against two conductors with different outer diameters.

The axial spacing distance D4 (FIG. 16) between the cable seats 224A, 234A and 225A, 235A can be varied. The body member 220 can slide up and down the bolt 272 relative to the lower body member 230 another along a slide axis B-B. Accordingly, the heights of the slots 211A, 211B can be independently varied.

In use, the shear head 276A of the nut 276 is engaged by a driver and forcibly rotated thereby. The shear head 276A may be faceted or otherwise shaped to mate with the tool. The nut 276 is thereby rotated relative to the axially and bolt 272, which may be rotationally constrained by a tool or an anti-rotation feature or mechanism of the connector 200. This causes the bolt 272 to translate up through the nut 276, which slides or translates the body portions 220 and 230 together (in respective converging directions) along the slide axis B-B. The shear head 276A will shear off of the base portion 276B at the breakaway section 276C when subjected to a prescribed torque. The base portion 276B may be faceted or otherwise configured to mate with a tool to enable loosening of the nut 276 to permit removal of the connector 200 from the cables.

According to some embodiments, the bolt 272 and the nut 276 may be formed of any suitable materials, such as steel (e.g., galvanized steel or stainless steel), aluminum alloy, plastic or zinc alloy.

Each lower blade member 252 is mounted in one of the blade slots 236B for movement with the upper body member 230. Each lower blade member 252 includes a body or base 252A having laterally opposed ends. Each end is provided with an integral cable engagement or insulation piercing feature 252B. Each insulation piercing feature 252B includes a plurality of serrations or teeth 252C separated by slots and having terminal points. The points of the teeth 252C may collectively lie on an arc generally corresponding to the profile of the arcuate outer surface of the corresponding cable conductor 12A, 14A.

Each upper blade member 254 is mounted in one of the blade slots 226B for movement with the upper body member 220. Each main blade member 254 includes a body or base 254A having axially opposed ends. Each end is provided with an integral cable engagement or insulation piercing feature 254B. Each insulation piercing feature 254B includes a plurality of serrations or teeth 254C separated by slots and having terminal points. The points of the teeth 254C may collectively lie on an arc generally corresponding to the profile of the arcuate outer surface of the corresponding cable conductor 12A, 14A.

The blade members 252, 254 are affixed in their respective blade seats such that the teeth 254C of the blade members 254 face the teeth 252C of the blade members 252.

According to some embodiments, the width of each blade member 252, 254 is at least ten times its thickness. According to some embodiments, the thickness of each the blade member 252, 254 is in the range of from about 0.05 and 0.125 inch.

The blade members 252, 254 may be formed of any suitable electrically conductive material. According to some embodiments, the blade members 252, 254 are formed of metal. According to some embodiments, the blade members 252, 254 are formed of aluminum, aluminum alloy, or copper and may be galvanized. The blade members 252, 254 may be formed using any suitable technique. According to some embodiments, each blade members 252, 254 is monolithic and unitarily formed. According to some embodiments, each of the blade member 252, 254 is extruded and cut, stamped (e.g., die-cut), cast and/or machined.

Figure 12:
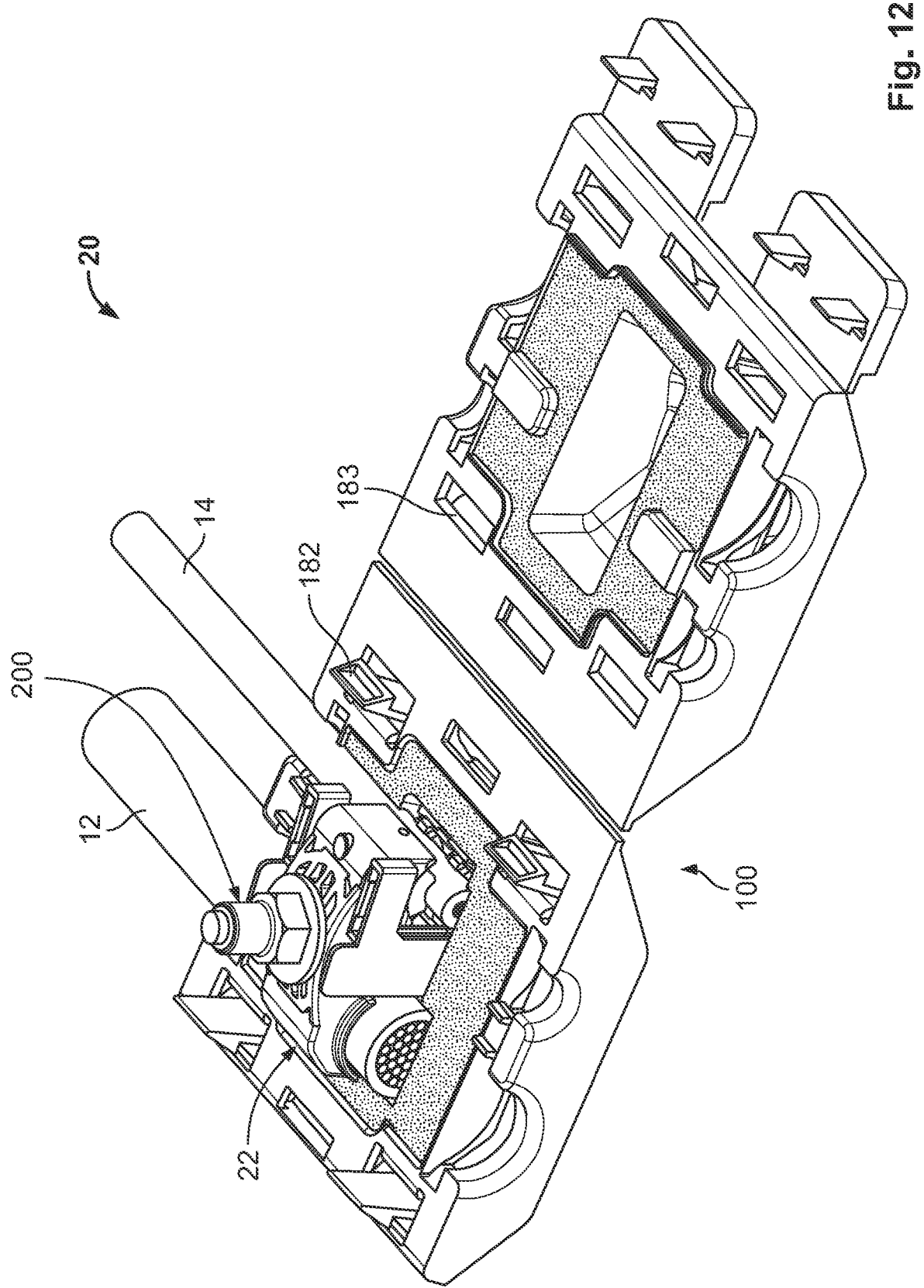
FIG. 12 is a perspective view of a connection and the enclosure assembly of the enclosed connection assembly of FIG. 2.

The sealant-filled enclosure 100 includes a housing 120 and masses of sealant 160, 170 disposed therein. According to some embodiments, and as discussed in more detail below, the sealant 160, 170 may be a gel. The housing 120 includes a first shell or cover member 122 and a second shell or cover member 124 joined to one another by a hinge 126 and adapted to move between an open position as shown in FIG. 12 and a closed position as shown in FIG. 1. In other embodiments, the cover members 122, 124 are not hinged. In the open position, the enclosure assembly 100 can receive the connection 22 and adjacent portions of the cables 12, 14. In the closed position, the enclosure assembly 100, including the masses of sealant 160, 170, may operate to seal about and protect the connection 22. The shape or geometry of the enclosure cavity 106 may resemble or substantially conform to that of the connector 200.

Figure 17:
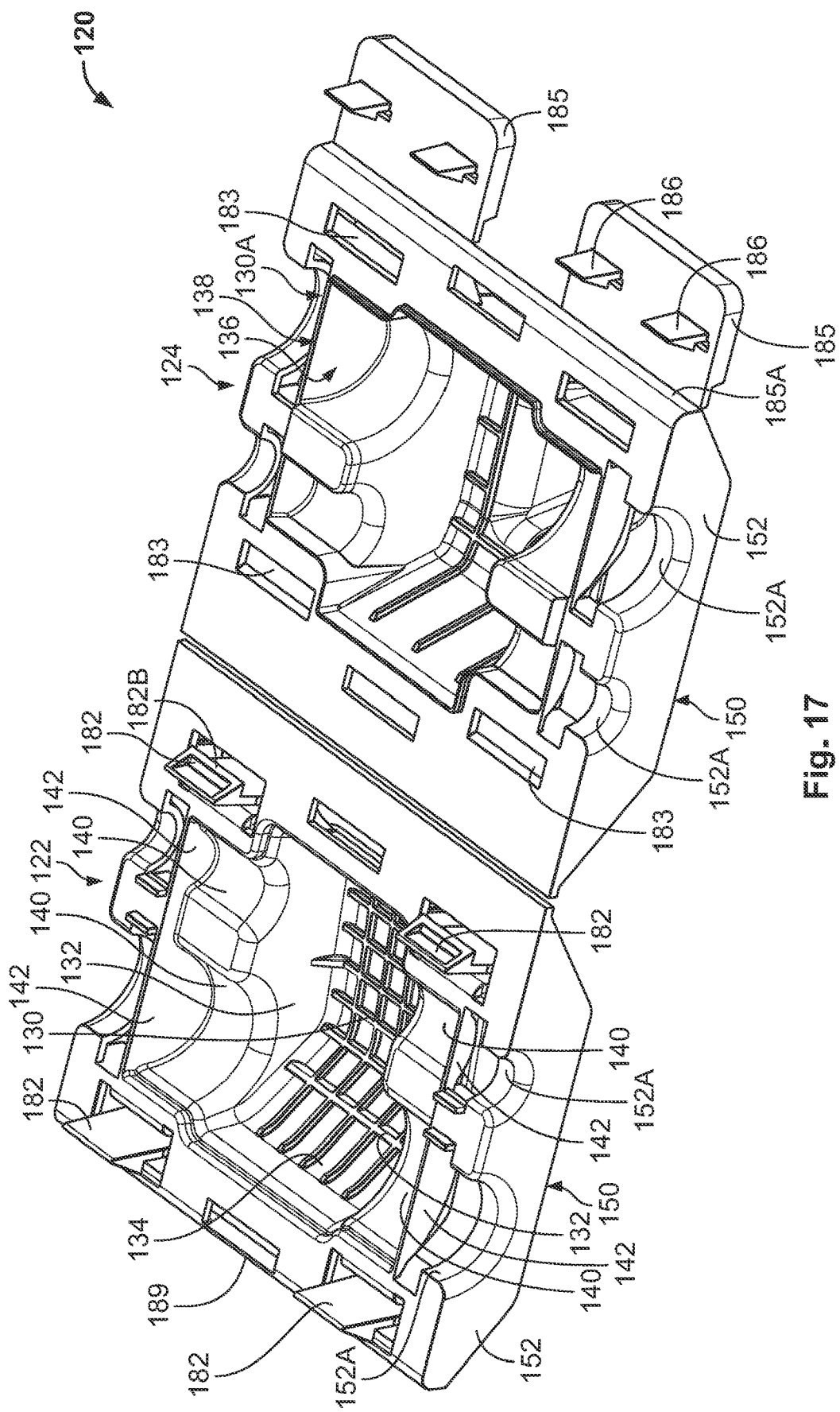
FIG. 17 is a perspective view of a housing forming a part of the enclosure assembly of FIG. 2.
Figure 18:
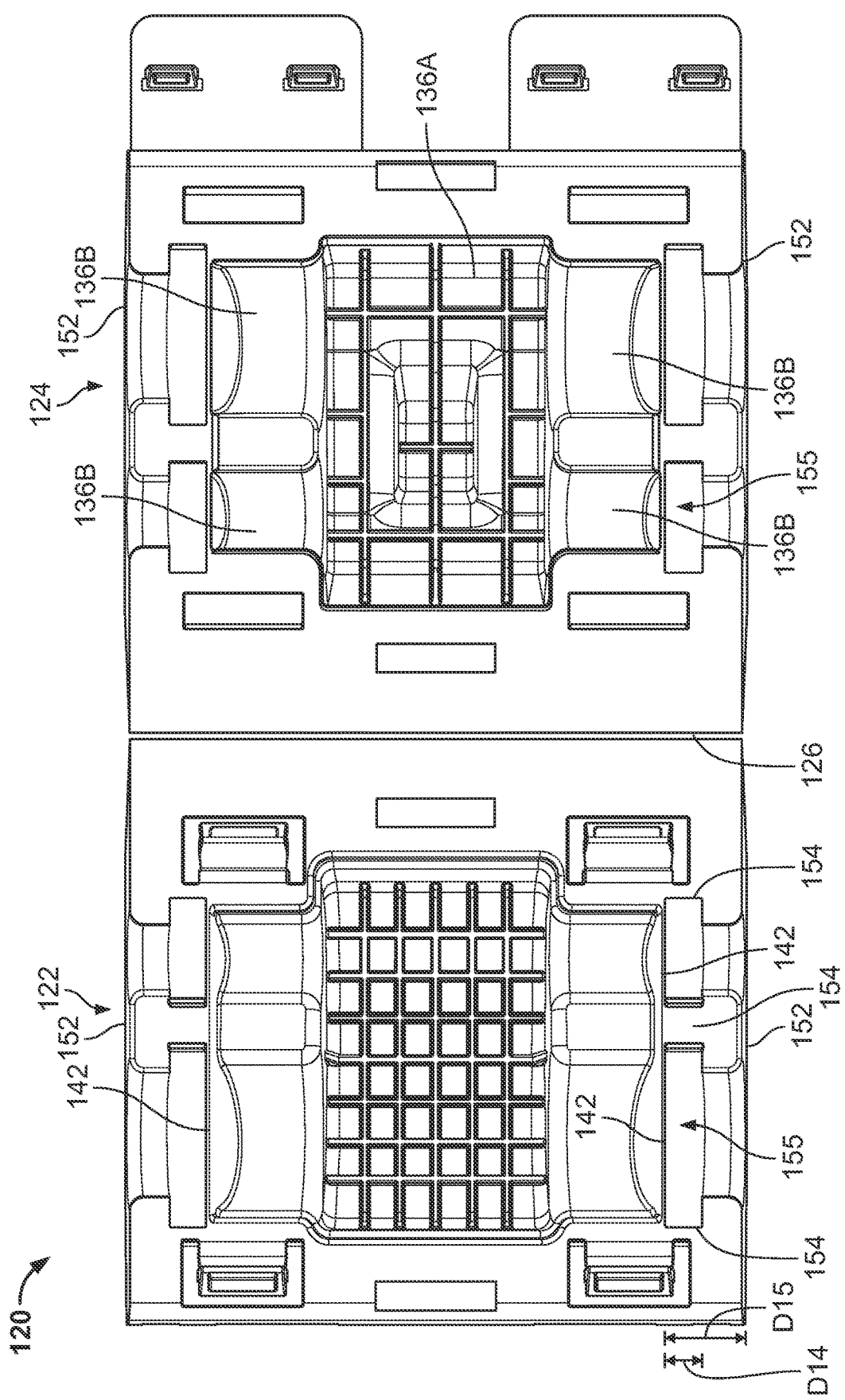
FIG. 18 is a top view of the housing of FIG. 17.
Figure 19:
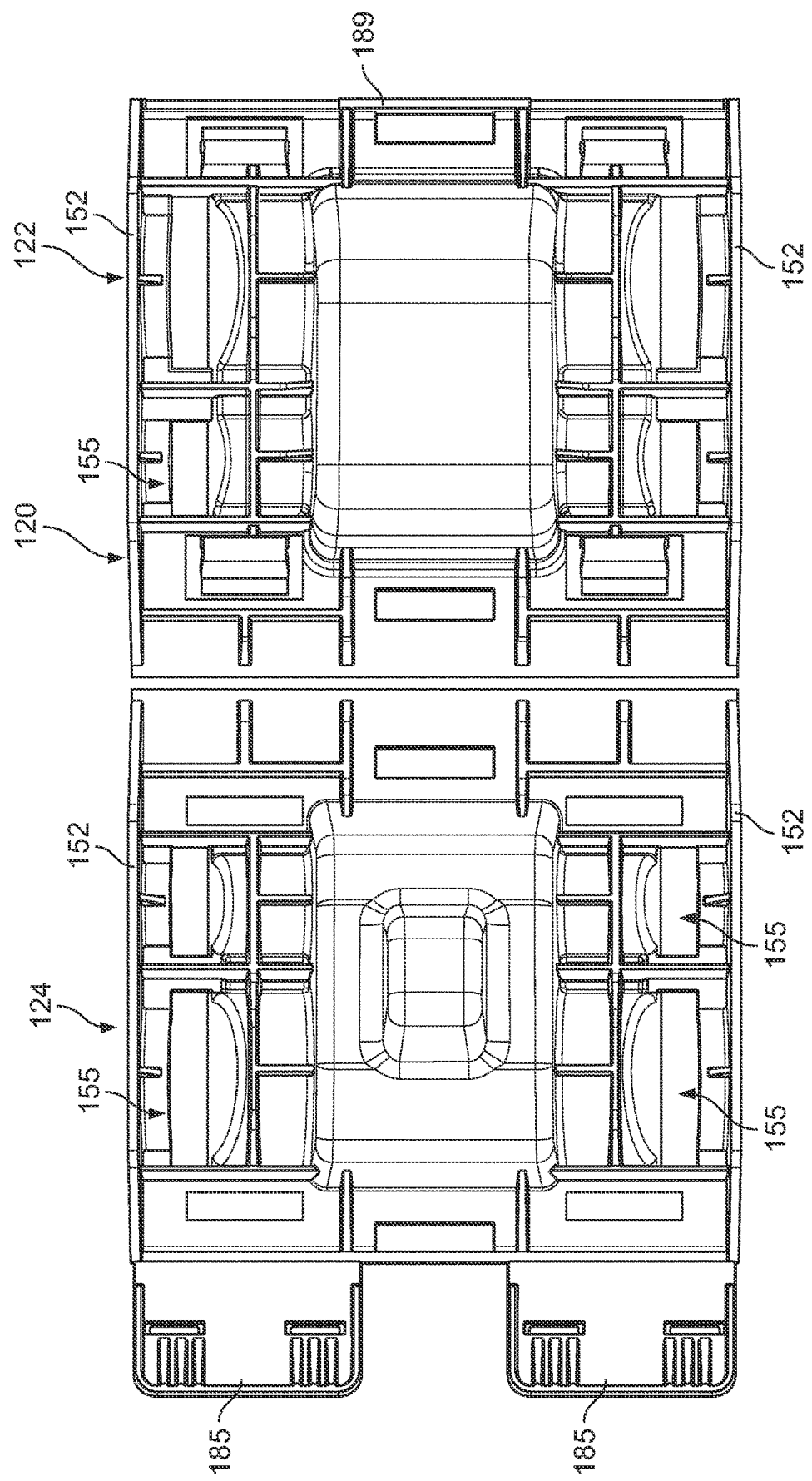
FIG. 19 is a bottom view of the housing of FIG. 17.
Figure 20:
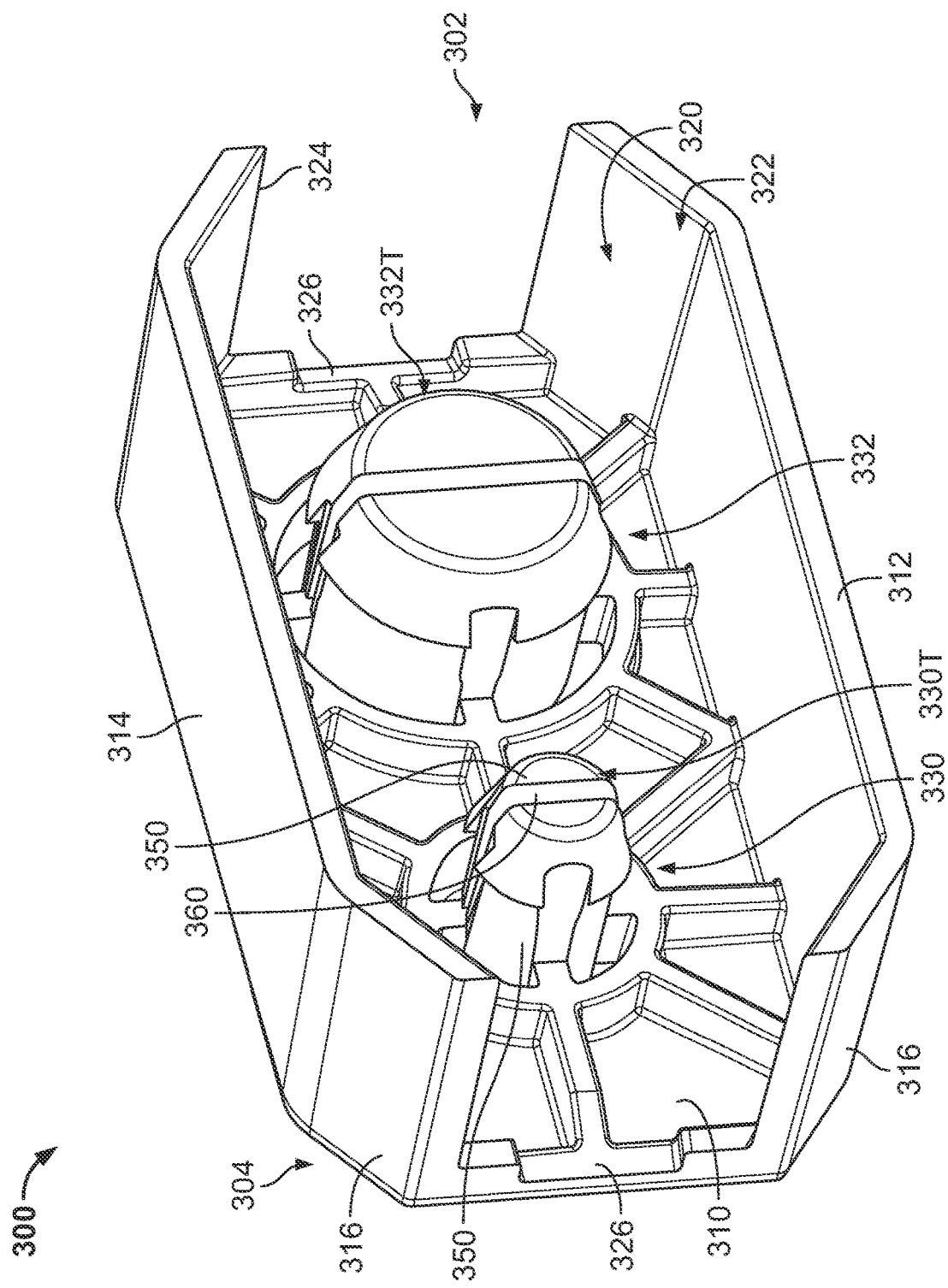
FIG. 20 is a rear perspective view of the protective end cap of FIG. 1.

Turning to the housing 120 in more detail and with reference to FIGS. 17-19, the cover members 122, 124 are constructed in generally the same manner, except for the shapes of their cavities, the shapes of their outer profiles, and the configurations of their latch structures.

Each cover member 122, 124 includes a bottom wall 130. Opposed side walls 132 and opposed end walls 134 extend upwardly from the bottom wall 130. Opposed pairs of port extensions 140 extend longitudinally from either end of each cover member 122, 124. Each port extension 140 is terminated by a port wall 142.

In the closed position, the enclosure assembly 100 defines an enclosure cavity 106 (FIG. 7) and opposed pairs of port channels 109 (FIG. 7) communicating with the enclosure cavity 106. More particularly, when the cover members 122, 124 are closed, each pair of opposing port extensions 140 combine to collectively form a respective chamber port CP1, CP2, CP3, CP4 (FIGS. 1 and 7), and a respective tubular chamber port channel 109 extending from the chamber port CP1-CP4 to the enclosure cavity 106. Each pair of opposed port walls 142 covers a respective one of the chamber ports CP1-CP4.

Each port wall 142 is configured and constructed to be opened or displaced to receive a cable in the corresponding chamber port CP1, CP2, CP3, CP4 and the corresponding chamber port channel 109. In some embodiments, each port wall 142 is a breakaway wall. In some embodiments, each port wall 142 is frangible (i.e., the port wall 142 is constructed to be broken open and away by breaking (e.g., tearing) the port wall 142). For example, each port wall 142 may include corrugations comprising a series of fingers joined by relatively thin membranes as shown, and the port wall 142 may be opened by tearing two or more of the fingers apart at one or more of the membranes.

The upper edges of the walls 132, 134 form a perimeter edge 138 defining an opening. The walls 130, 132, 134 and the port extensions 140 of each cover member 122, 124 define an overall cover member chamber or cavity 136 and a front opening 130A communicating with cavity 136. The cavity 136 (FIG. 18) includes a main cavity portion 136A and conductor port subchannels 136B defined within each port extension 140.

The cover members 122, 124 are pivotably joined by the hinge 126. According to some embodiments, the hinge 126 is a flexible, living hinge. A living hinge may allow for unitary formation of the housing 120, as well as possible cost savings in materials and assembly. Alternatively, other hinge configurations may be employed. For example, the hinge 126 may be replaced by or supplemented with interlocking pivotally coupled hinge structures and/or a pivot pin. Alternatively, the cover members 122, 124 may be non-hinged.

With reference to FIG. 18, the housing 120 includes a latch system including four integral latch mechanisms. Each latch mechanism includes a latch finger 182 on and projecting inwardly from the cover member 124. Each latch mechanism further includes a latch slot or opening 183 in the cover member 122. The latch fingers 182 may be integrally formed with the cover member 124. The latch fingers 182 and openings 183 can be selectively engaged, whereupon they cooperate to releasably secure the cover members 122, 124 in a closed configuration as shown in FIG. 1. Each latch finger 182 has an elastically deflectable leg and an integral interlock section or barb 182B. The barb 182B is configured to enter through the associated opening 183 and interlock with the cover member 124.

The housing 120 further includes a safety latch mechanism. With reference to FIGS. 17-19, the safety latch mechanism includes two side-by-side safety latch members 185 located on the end of the cover member 124 opposite the hinge 126. Each latch member 185 is pivotably connected to the cover member 124 by a hinge 185A (e.g., a living hinge). The safety latch mechanism also includes an interlock feature in the form of a widthwise extending latch flange 189. Each latch member 185 includes a pair of barbed latch fingers 186.

With reference to FIGS. 17-19, each cover member 122, 124 includes a pair of opposed strain relief features, anchoring portions or frame portions 150 extending longitudinally and laterally outboard from the port walls 142 on either side. The frame portions 150 collectively form a cable strain relief system 151.

Each frame portion 150 includes a longitudinally extending strain relief wall 152 and legs 154 connecting the wall 152 to the adjacent side wall 132. The walls 152 are rigidly affixed to the side walls 132 by the legs 154.

Figure 8:
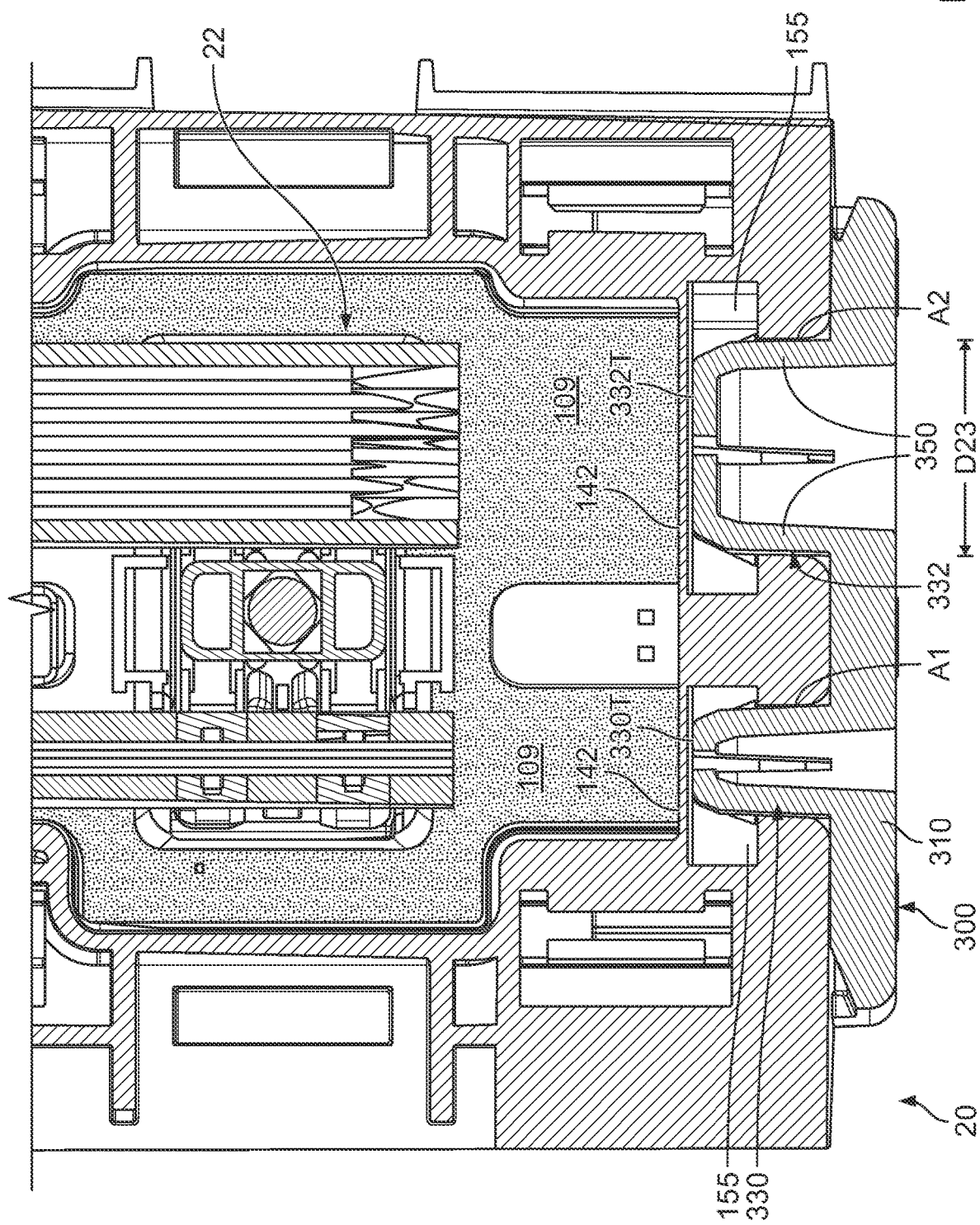
FIG. 8 is an enlarged, fragmentary, top cross-sectional view of the enclosed connection assembly of FIG. 2 taken along the line 6-6 of FIG. 5.
Figure 9:
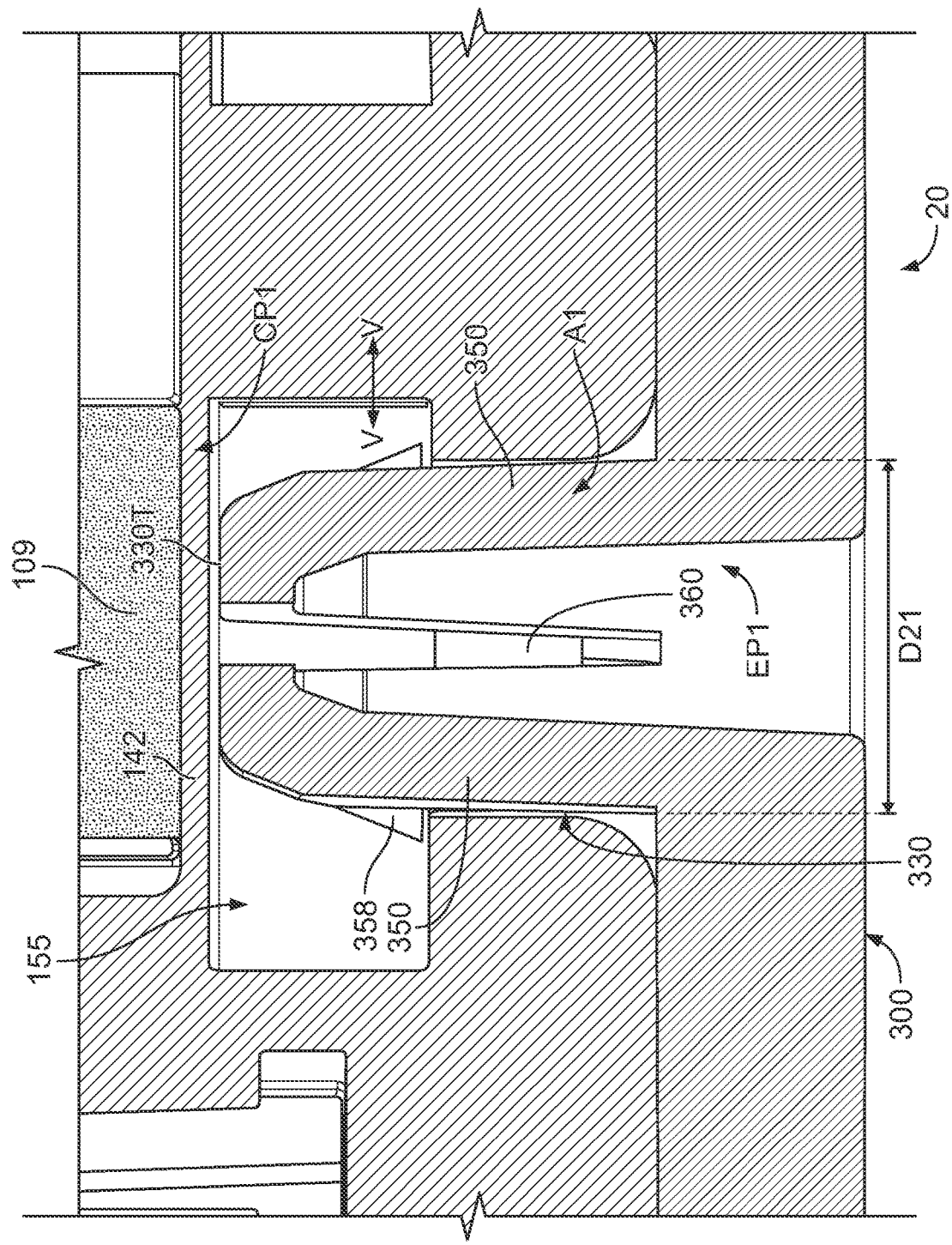
FIG. 9 is a further enlarged, fragmentary, top cross-sectional view of the enclosed connection assembly of FIG. 2 taken along the line 6-6 of FIG. 5.
Figure 10:
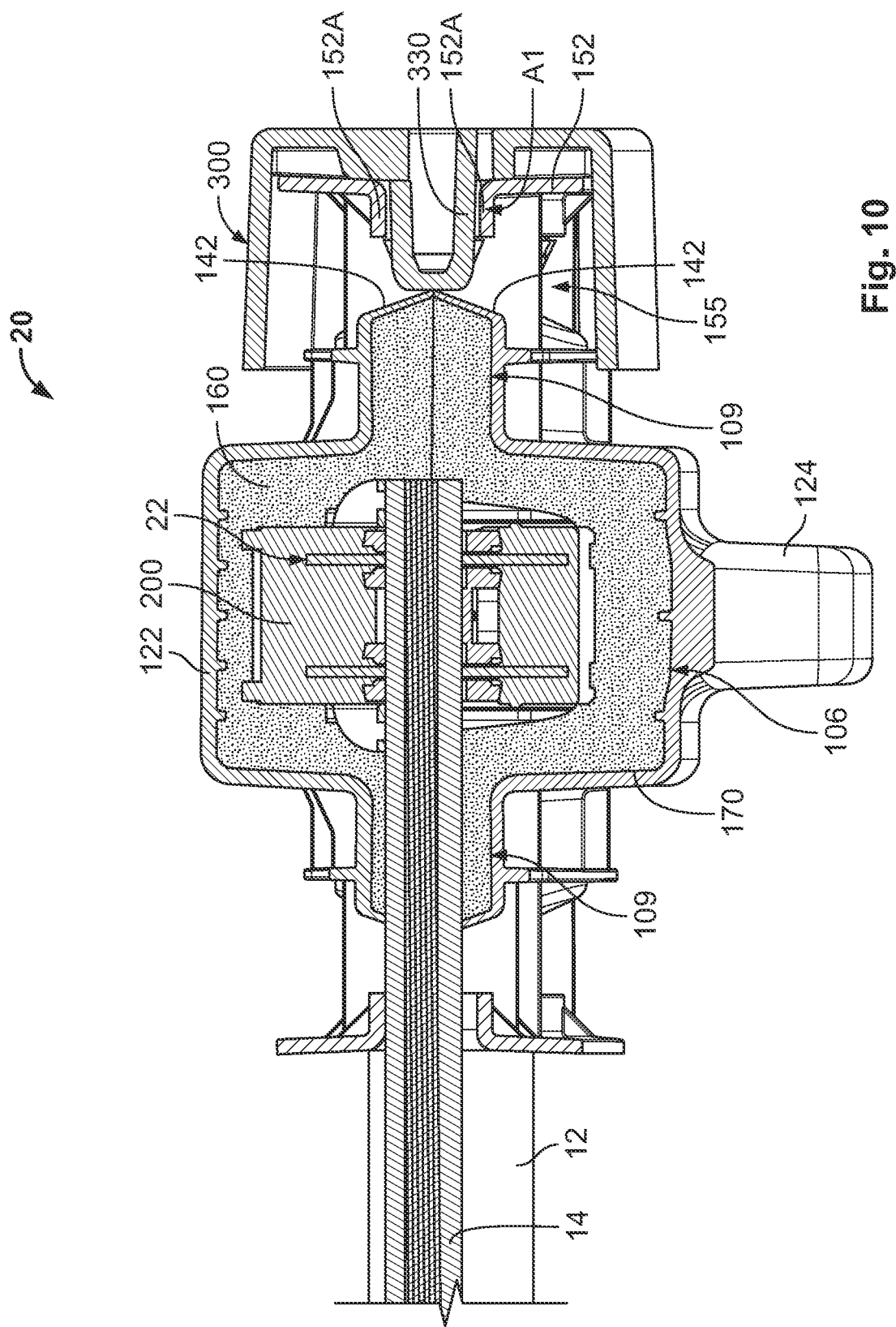
FIG. 10 is a cross-sectional view of the enclosed connection assembly of FIG. 2 taken along the line 10-10 of FIG. 5.
Figure 11:
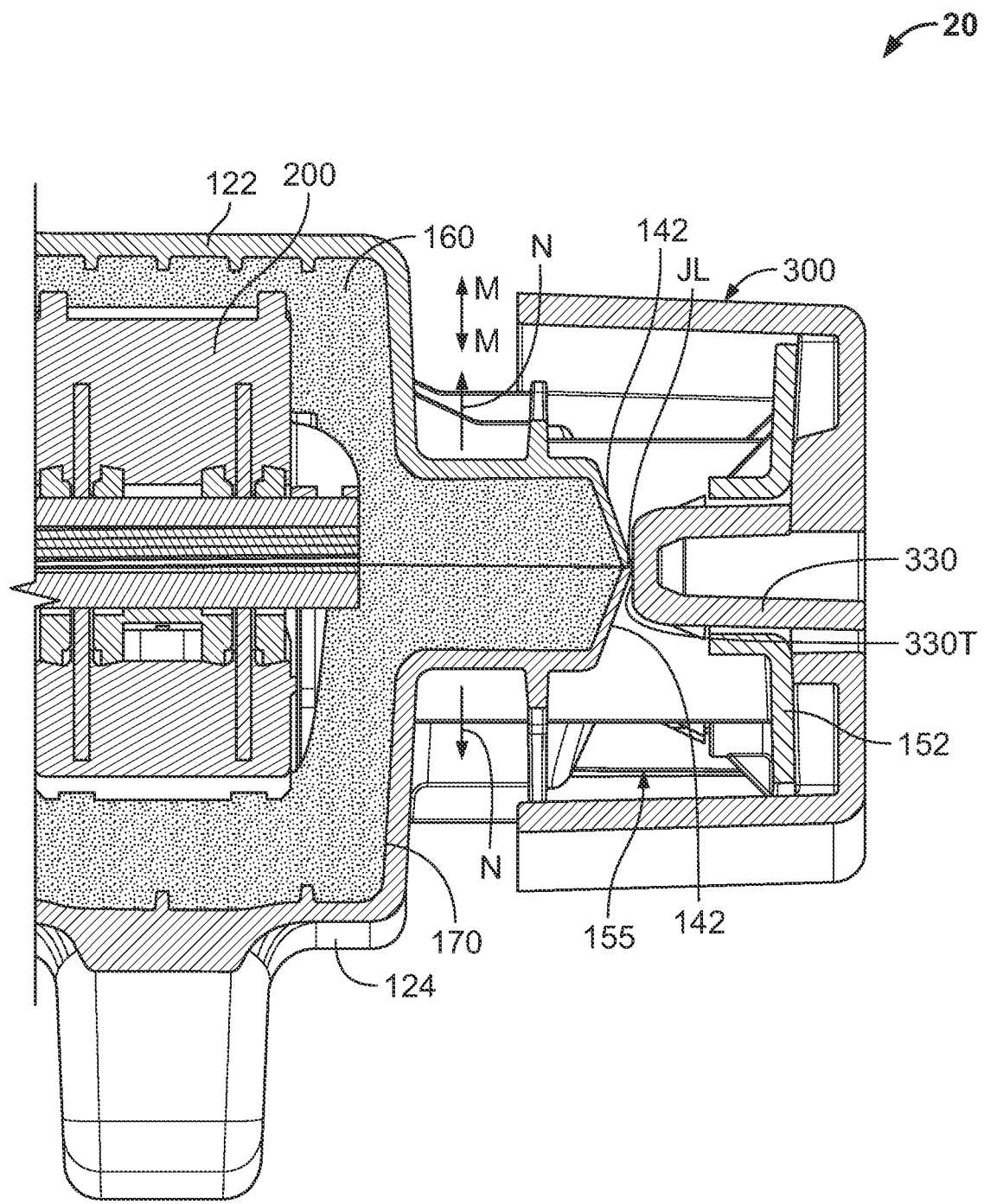
FIG. 11 is an enlarged, fragmentary, cross-sectional view of the enclosed connection assembly of FIG. 2 taken along the line 10-10 of FIG. 5.

Each strain relief wall 152 includes a pair of strain relief channels or slots 152A defined therein. In some embodiments, each slot 152A is semicircular. When the cover members 122, 124 are closed (as shown in FIGS. 1 and 10), each pair of opposing slots 152A combine to form a respective strain relief opening or access port A1, A2, A3, A4 (FIGS. 1, 4 and 8). Each access port A1-A4 is aligned with a respective one of the chamber ports CP1-CP4. Each access port A1, A2, A3, A4 and the chamber port CP1, CP2, CP3, CP4 with which it is aligned collectively form a respective enclosure port EP1, EP2, EP3, EP4 (FIGS. 1 and 4), respectively.

In some embodiments, the distance D15 (FIG. 18) from each frangible port wall 142 to the outer end of the adjacent access port A1, A2, A3, A4 is in the range of from about 0.5 inch to 0.875 inch.

Each strain relief wall 152 is spaced away from the adjacent side wall 132 so that a gap, slot, cavity, opening or void 155 is defined between each port wall 142 and its adjacent slot 152A.

Likewise, the voids 155 separate the port walls 142 (and, thus, the chamber ports CP1-CP4) from their associated access ports A1, A2, A3, A4. In some embodiments, each wall 152 and each access port A1, A2, A3, A4 is spaced away from the adjacent port wall 142 a standoff distance D14 (FIG. 18) in the range of from about 0.2 inch to 0.4 inch.

The housing 120 may be formed of any suitable material. According to some embodiments, the housing 120 is formed of an electrically insulative material. In some embodiments, the housing 120 is formed of a vacuum formed or molded polymeric material. The housing 120 may be formed of polypropylene, nylon, polyethylene, ABS and/or PMMA. The housing 120 may be formed of a flame retardant material. The housing material may be any color or transparent.

Figure 13:
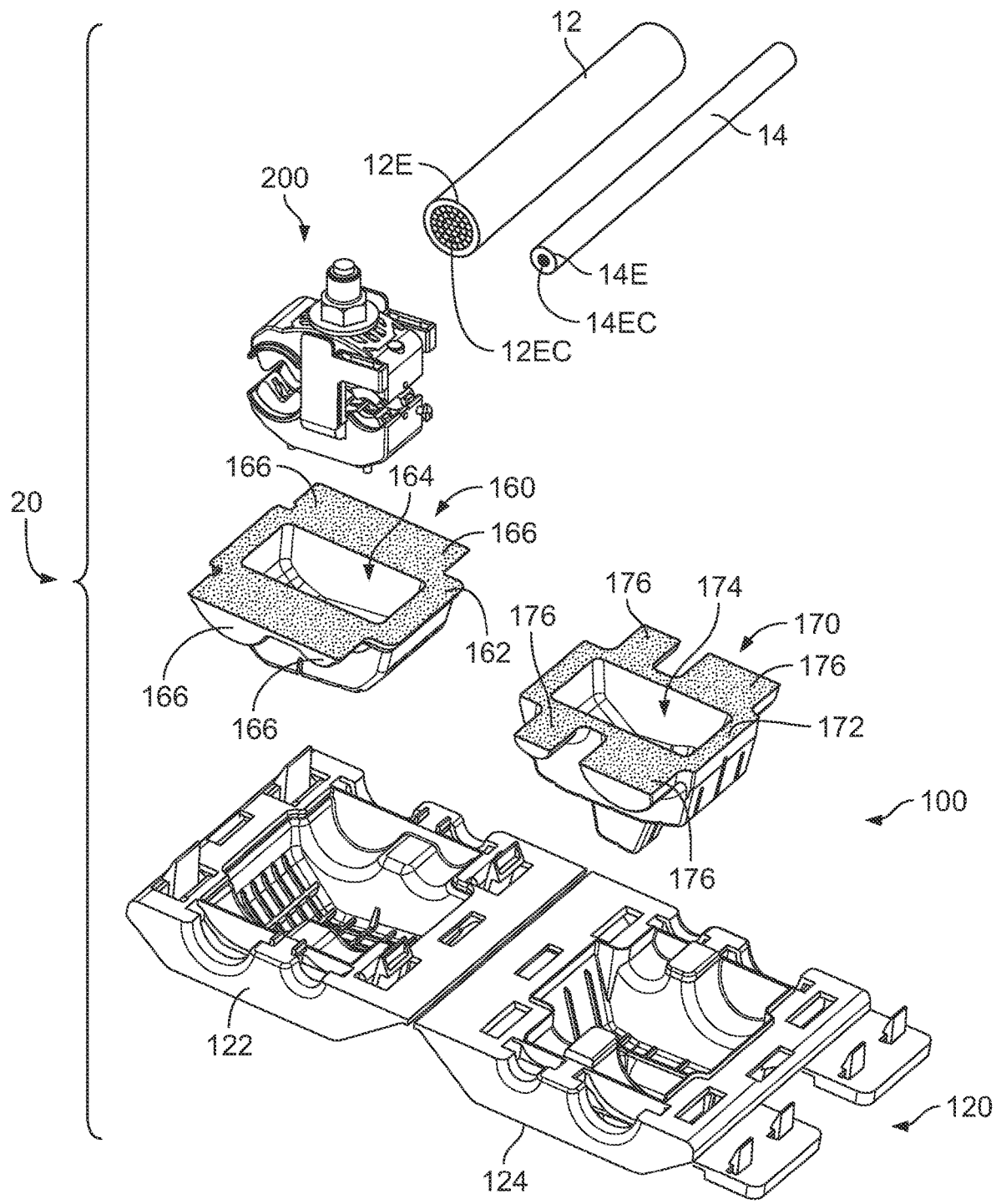
FIG. 13 is an exploded, perspective view of the connection and the enclosure assembly of FIG. 12.

Prior to use, the sealant 160 (FIG. 13) may be contained in the cavity 136 of the cover member 122 such that a main sealant portion 162 of the sealant is disposed in the main cavity 136 and port sealant portions 166 are disposed in the port subchannels 136B.

According to some embodiments, a void 164 is preformed or defined in the sealant 160. According to some embodiments, the void 164 is open to the opening 130A. According to some embodiments, the sealant 160 fully surrounds the remainder of the void 164 so that the void 164 is spaced apart from cover member 122 (by the sealant 160) on all sides except the top side. According to some embodiments, the sealant 160 fills the cover member cavity 136 (not including the volume of the void 164) to a level near but not fully to the perimeter edge 138. In other embodiments, the sealant 160 fills the cover member cavity 136 of the cover member 122 substantially fully up to the perimeter edge 138 or to any other desired level. According to some embodiments, the void 164 has sloped side walls that taper outwardly in a direction from the bottom wall 130 to the opening 130A.

According to some embodiments, the void 164 is shaped to conform to the lower half of the connector 200. However, the void 164 may be of any other suitable shape.

Prior to use, the sealant 170 (FIG. 13) may be contained in the cavity 136 of the cover member 124 such that a main sealant portion 172 of the sealant is disposed in the main cavity 136 and port sealant portions 176 are disposed in the port subchannels 136B.

According to some embodiments, a void 174 is preformed or defined in the sealant 170. According to some embodiments, the void 174 is open to the opening 130A. According to some embodiments, the sealant 170 fully surrounds the remainder of the void 174 so that the void 174 is spaced apart from cover member 124 on all sides except the top side. According to some embodiments, the sealant 170 fills the cavity 136 of the cover member 124 to a level near but not fully to the perimeter edge 138. In other embodiments, the sealant 170 fills the cover member cavity 136 (not including the volume of the void 174) substantially fully up to the perimeter edge 138 or to any other desired level.

The sealants 160, 170 may be any suitable sealants. According to some embodiments, the sealants 160, 170 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in U.S. Pat. No. 4,600,261 to Debbaut (hereinafter "Debbaut '261") and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in PCT Pub. No. WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\% \qquad 1$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 160, 170 are gels as described above, other types of sealants may be employed. For example, the sealants 160, 170 may be silicone grease or hydrocarbon-based grease.

The enclosure assembly 100 may be formed in the following manner. The cover members 122, 124 and the hinge 126 may be integrally formed. According to some embodiments, the cover members 122, 124 and the hinge 126 are unitarily molded. According to some embodiments, the entirety of the housing 120 is unitarily molded. The housing 120 may be injection molded or vacuum formed, for example. According to other embodiments (e.g., if the cover members are not hinged), the cover members 122, 124 are separately molded or otherwise formed. According to some embodiments, the cover members 122, 124 and the hinge 126 are monolithic.

If the sealant 160, 170 is a material, such as a curable gel, that requires curing, the sealant may be cured in situ. According to some embodiments, spacer inserts having the shape and size of the voids 164 and 174, respectively, are placed in each the cavities 136 of the cover member 122 and the cover member 124, respectively. Liquid, uncured sealant is dispensed into the cavities 136 such that it fills the cavities 136 of the cover members 122, 124 up to the desired level. The sealant may then be cured in situ. The spacer inserts are then removed to provide the voids 164, 174 in the sealants 160, 170.

With reference to FIGS. 20-28, the protective end cap 300 has an end cap lengthwise axis L-L (FIG. 23), an end cap heightwise axis H-H (perpendicular to the axis L-L) (FIG. 22), and an end cap depthwise axis D-D (perpendicular to the axes L-L and H-H). The end cap 300 has an inner side 302 and an opposing outer side 304.

The end cap 300 includes a base wall 310, an integral upper side wall 312 and an integral lower side wall 314. The side walls 312, 314 extend along opposed lateral edges of the base wall 310 and project inwardly from the base wall 310. Each side wall 312, 314 has sloped or tapered shoulder portions 316 to generally conform to the shape of the closed enclosure housing 120.

The end cap 300 further includes an integral first mounting or insert feature 330 and an integral second mounting or insert feature 332. Each insert feature 330, 332 has the form of a protrusion, plug or pin. The insert features 330 and 332 have distal terminal ends 330T and 332T, respectively.

The walls 310, 312, 314 collectively define an end cap cavity 320 and an inner opening 322 communicating with the cavity 320, on the inner side 302. The walls 310, 312, 314 also define slots 324 communicating with the cavity 320. Removal or pry slots 326 are defined in the ends of the end cap 300. Through holes 328 may also be formed in the end cap 300 to facilitate injection molding of the end cap 300.

The insert features 330, 332 may be constructed in substantially the same manner. Therefore, only the insert feature 330 will be described below, it being understood that this description likewise applies to the insert feature 332. In some embodiments and as shown, the insert features 330, 332 are differently sized from one another to better conform to the respective ports access ports A1-A4 into which they are adapted to be inserted.

The insert feature 330 has an insert feature axis P-P (FIG. 22) that extends substantially parallel to the axis D-D. The insert feature 330 includes a pair of opposed legs 350. The legs 350 collectively define a slot 360 and a cavity 362 therebetween. The slot 360 has a slot axis Q-Q (FIG. 24) that extends substantially perpendicular to the axis P-P and the axis L-L.

Figure 25:
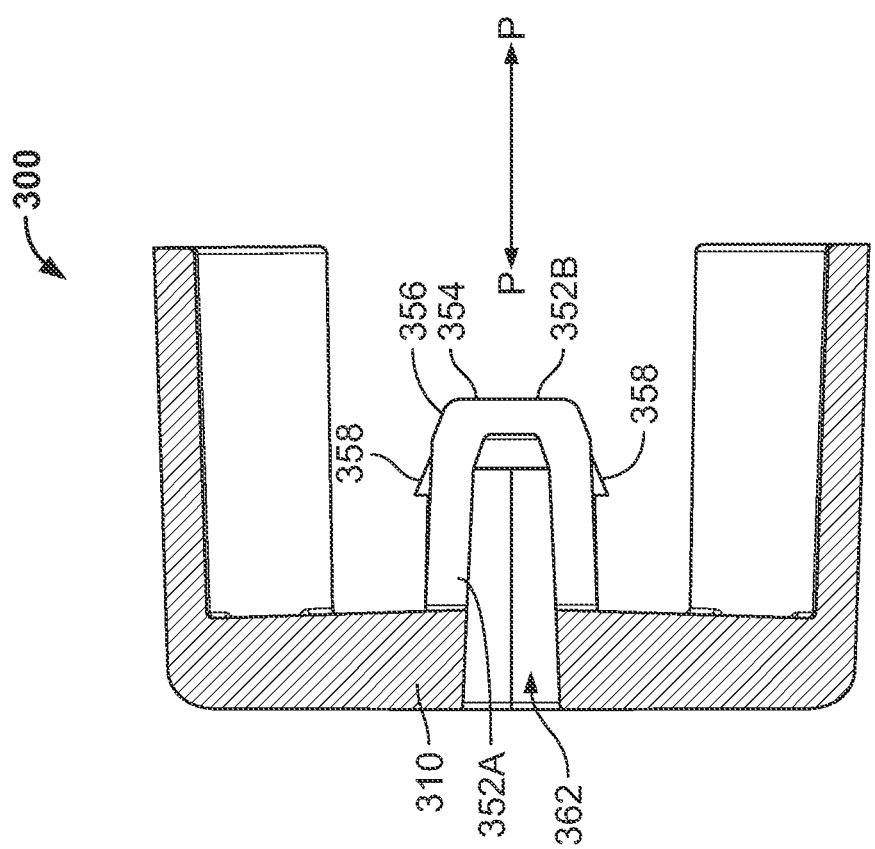
FIG. 25 is a cross-sectional view of the protective end cap of FIG. 1 taken along the line 25-25 of FIG. 24.
Figure 26:
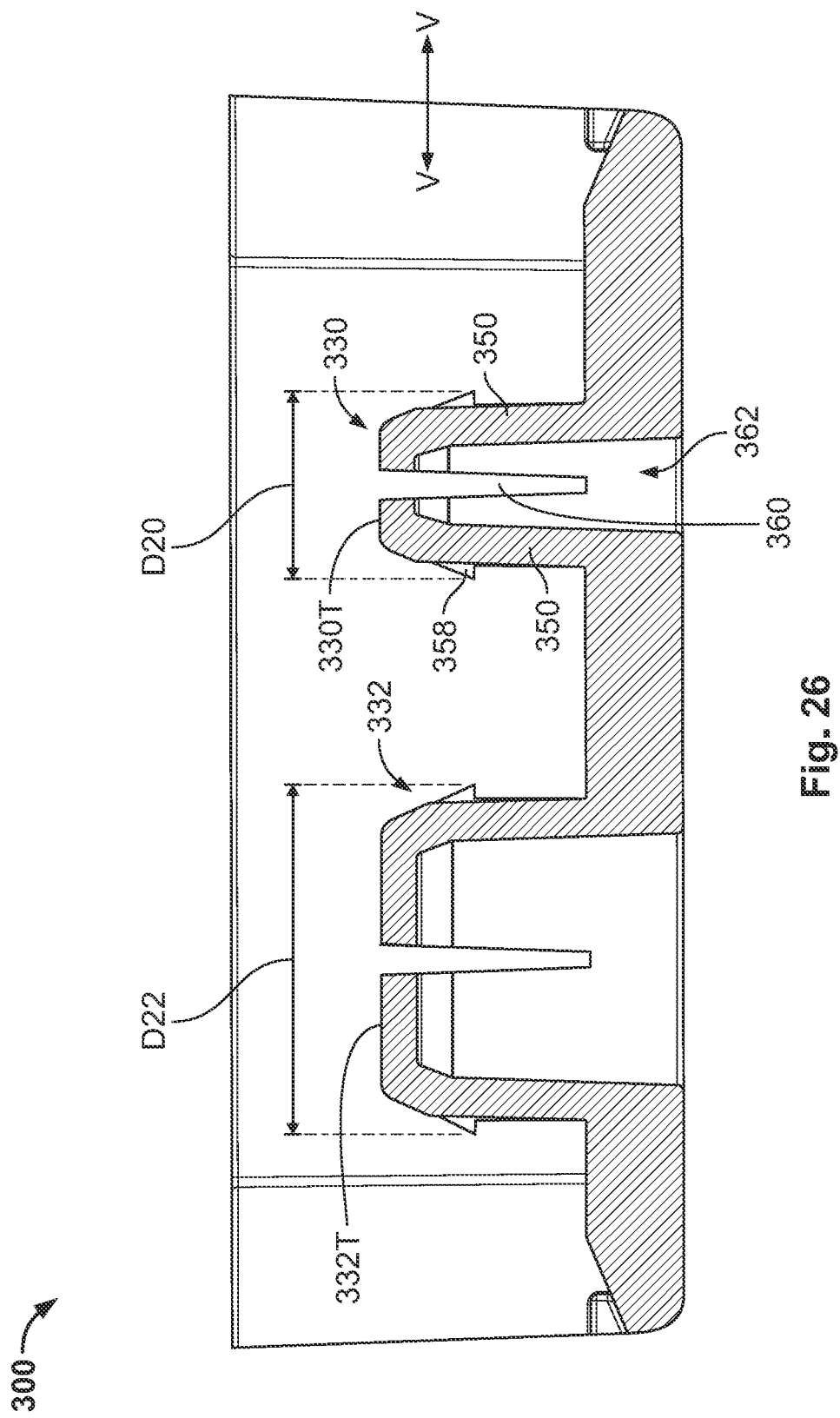
FIG. 26 is a cross-sectional view of the protective end cap of FIG. 1 taken along the line 26-26 of FIG. 24.

With reference to FIG. 25, each leg 350 has a base or proximal end 352A secured to the base wall 310, and an opposing free or distal end 352B. The legs 350 are thus cantilevered from the base wall 310.

The distal end 352B of each leg 350 includes an end wall 354, a rounded distal portion of the shoulder 356, and an integral latch feature or barb 358. The shoulders 356 of the two legs 350 collectively form a sloped, tapered or frustoconical surface to facilitate insertion of the insert features 330, 332 into the access ports A1-A4.

Figure 27:
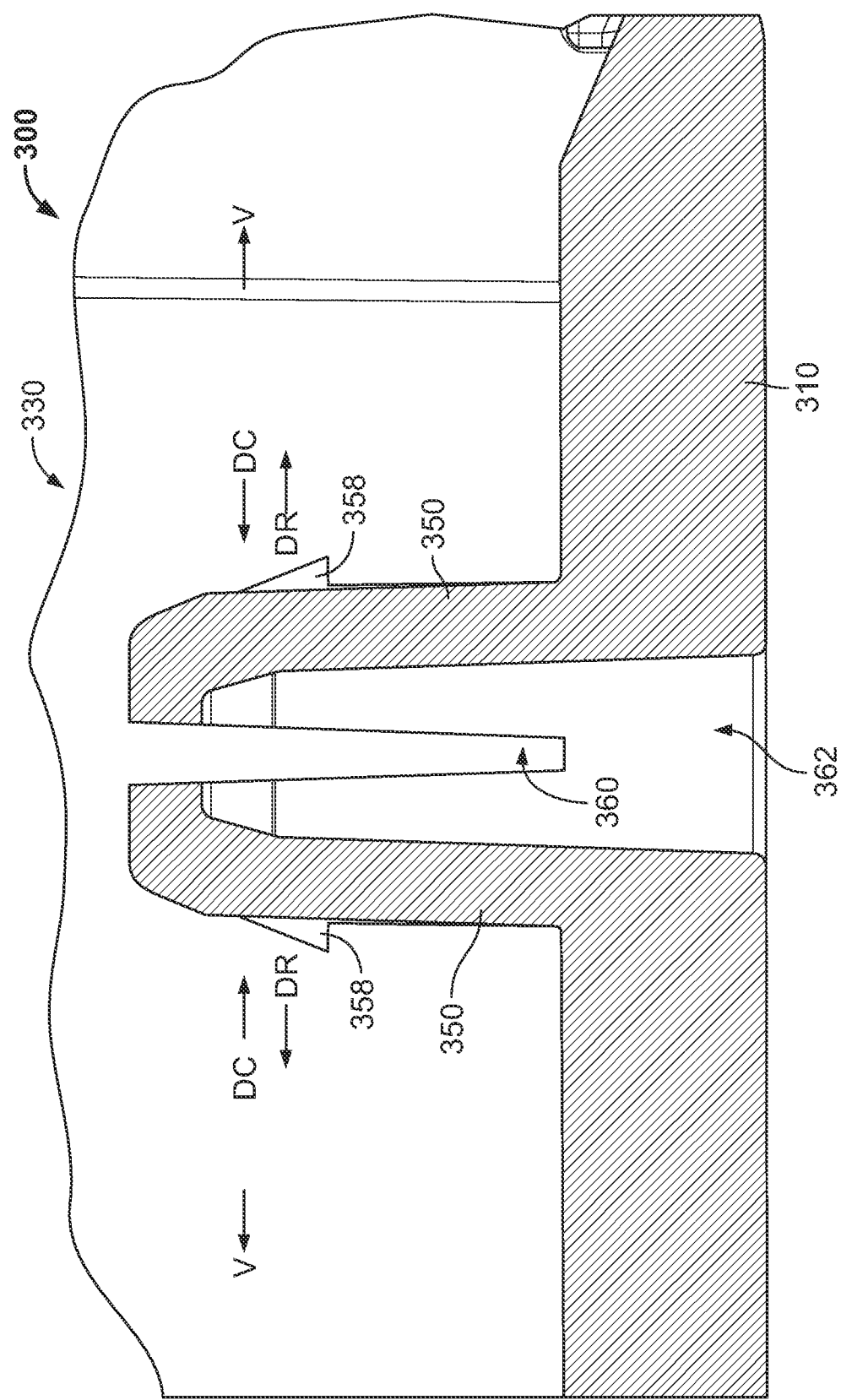
FIG. 27 is an enlarged, fragmentary, cross-sectional view of the protective end cap of FIG. 1 taken along the line 26-26 of FIG. 24.

The opposed legs 350 are resiliently flexible at their joints with the base wall 310 and/or within each leg 350 to permit the legs 350 to be relatively displaced, bent or deflected in a converging directions DC along a deflection axis V-V(FIG. 27). The deflection axis V-V is transverse to, and in some embodiments substantially perpendicular to, the slot axis Q-Q. The legs 350 are resilient so that, when deflected in the converging directions DC, they exhibit a return force tending to move each leg 350 in an opposing return direction DR (FIG. 27).

The barbs 358 of the insert feature 330 have an outer width or diameter D20 (FIG. 26) when the legs 350 are in their nondeflected (relaxed) positions. The barbs 358 of the insert feature 332 have an outer diameter D22 when its legs 350 are nondeflected.

The end cap 300 may be formed of any suitable material. According to some embodiments, the end cap 300 is formed of an electrically insulative material. In some embodiments, the end cap 300 is formed of a vacuum formed or molded polymeric material. The end cap 300 may be formed of polypropylene, nylon, polyethylene, ABS and/or PMMA. The end cap 300 may be formed of a flame retardant material. The end cap 300 material may be any color or transparent.

The walls 310, 312, 314, and insert features 330, 332 may be integrally formed. According to some embodiments, the walls 310, 312, 314 and the insert features 330, 332 are unitarily molded. According to some embodiments, the entirety of the end cap 300 is unitarily molded. The end cap 300 may be injection molded or vacuum formed, for example. According to some embodiments, the end cap 300 is monolithic.

The enclosed connection system 20 can be used as follows in accordance with methods of the present invention to form the enclosed connection 24. Generally, the connection 22 is first formed by installing the connector 200 on the cables 12, 14. Thereafter, the enclosure assembly 100 is installed over the connection 22 and portions of the cables 12, 14. The protective end cap 300 is then mounted on enclosure assembly 100.

The connector 200 can be used as follows in accordance with methods of the present invention to form the connection 22.

If necessary, the compression mechanism 270 is loosened or opened to permit the jaw portions 224, 234 and 225, 235 (and thereby the blade members 252, 254) to be separated. The cable 12 (with the insulation layer 12B covering the conductor 12A) is inserted in or between the cable grooves 224A, 234A and the cable 14 (with the insulation layer 14B covering the conductor 14A) is inserted in or between the cable grooves 225A, 235A. The cables 12, 14 can be axially or laterally inserted into the slots defined between the jaws.

The nut 276 is then driven to compress the compression mechanism 270 along the slide axis B-B and thereby drive the jaws 224, 234 and 225, 235 together along a clamping axis parallel to the slide axis B-B. The nut 276 is driven until a prescribed torque is applied. The shear nut 276 is driven via the shear head 276A until a prescribed torque is applied, whereupon the shear head 276A will break off at the shear section 276C, thereby helping to ensure that the proper load is applied to the blade members 252, 254, 256.

As a result, the insulation piercing features 252B, 254B of the opposed pairs of the blade members 252, 254 are driven to converge on and capture the cables 12, 14 therebetween. More particularly, the teeth 252C, 254C of each blade member 252, 254 are forced through the insulation layer 12B and into mechanical and electrical contact with the conductors 12A, 14A. The teeth 252C, 254C embed in the insulation layers 12B, 14B and make electrical and mechanical contact or engagement with the conductors 12A, 12B. In the foregoing manner, the connector 200 is operatively connected to the cables 12, 14 and the conductors 12A, 14A are electrically connected to one another without stripping the insulation layers 12B, 14B.

According to some embodiments, the teeth 252C, 254C embed in the conductors 12A, 14A. According to some embodiments, the teeth 252C, 254C embed into the conductors 12A, 14A a distance of at least about 0.5 mm.

In the foregoing manner, the connection 22 is formed. The blade members 252, 254 provide electrical continuity (i.e., a path for electrical current flow) between the conductors 12A, 14A of the cables 12, 14. The connector 200 mechanically secures the cables 12, 14 relative to one another.

Once the connection 22 has been constructed as described above, the enclosure assembly 100 is installed on the connection 22 and the cables 12, 14. The enclosure assembly 100 may be held in a fully or partially open position as shown in FIG. 12 and the connection 22 may be inserted between the cover members 122, 124. The enclosure assembly 100 is then closed by urging one or both of the cover members 122, 124 to relatively pivot about the hinge 126 into engagement as shown in FIG. 1, such that the latch fingers 182 and latch openings 183 are made to interlock in the closed position.

The safety latch members 185 are then pivoted in a direction FP(FIG. 2) about the hinges 185A until the barbs of their latch fingers 186 interlock with the latch flange 189, as shown in FIG. 1.

The closed housing 120 defines an enclosure cavity 106 including a main enclosure cavity 106 and contiguous port channels 109 (collectively defined by the port extensions 140). The connector 200 is received in the voids 164, 174 of the sealants 160, 170. The connection 22 is encapsulated within the sealant 160, 170, and the sealant 160, 170 and the connection 22 are in turn encapsulated within the housing 120 (i.e., contained within the enclosure cavity 106). The portions of the cables 12, 14 within the connection 22 and extending from the connection 22 and through the port channels 109 to the frangible walls 142 are likewise encapsulated in the sealant 160, 170.

The connection 22 is oriented relative to the cover member 122, 124 such that the lower portion 200A of the connector 200 is received and seats in the void 164, and the upper portion 200B of the connector 200 is received in the void 174.

Prior to or as the enclosure assembly 100 is closed, the cables 12, 14 may break or splay the frangible walls 142 so that the cables 12, 14 pass therethrough and are generally surrounded thereby. The walls 142 may be angled outwardly so that they tend to be splayed outwardly by the cables 12, 14.

According to some embodiments and as illustrated, the volumes and configurations of the sealants 160, 170 are selected to ensure that the connection 22 displaces at least one, and according to some embodiments, both of the sealants 160, 170 when the enclosure assembly 100 is transitioned from the opened position to the closed position with the connection 22 disposed therein.

According to some embodiments, the combined volume of the connector 200, the portions of the cables 12, 14 in the enclosure cavity 106, and the sealants 160, 170 is greater than the volume of the enclosure cavity 106.

According to some embodiments, when the enclosure assembly 100 is installed as described herein, the closing of the cover members 122, 124 about the connection 22 forcibly displaces the sealants 160, 170 about the connector 200 such that the sealants 160, 170 flow around the connector 200 and, in some cases, into interstices within the connector 200. According to some embodiments, the sealants 160, 170 substantially fully encapsulate the connector 200. According to other embodiments, the sealants 160, 170 only partially surround the connector 200 (e.g., in the case where the voids 164, 174 extend to the bottom walls 130).

As will be appreciated from the description herein, the sealant 160, 170 engages portions of the cables 12, 14 to form seals thereabout. The sealant 160, 170 also forms a sealing block that surrounds the connector 200, thereby sealing the connector 200. Notably, in the illustrated enclosure assembly 100, the sealant masses 160, 170 connect with one another to encapsulate the connector 200 and cables 12, 14.

The enclosure assembly 100 may be sized and configured to accommodate and seal multiple or a range of sizes of connectors 200 and cables 12, 14.

The cover assembly 100 and the connector 200 are re-enterable and removable for system disconnects, service or maintenance. In some embodiments, the cover assembly 100 and connector 200 are intended to be replaced and not re-used.

The closed enclosure assembly 100 includes a first set or pair of chamber ports CP1, CP2 on one lateral side 103L (FIG. 1) of the housing 120 and an opposing second set or pair of chamber ports CP3, CP4 on the opposite lateral side 103R of the housing 120. The chamber port CP1 is aligned with the opposing chamber port CP4, and the chamber port CP2 is aligned with the opposing chamber port CP3. This port arrangement is provided to accommodate installations wherein the cables 12, 14 extend fully through the enclosure assembly 100. In that case, the cable 14 will extend continuously through the chamber port CP4, the enclosure cavity 106 (where the cable 14 connects with the connector 200), and the chamber port CP1. The cable 12 may likewise extend through the chamber port CP3, the enclosure cavity 106, and the chamber port CP2. Because the cables 12, 14 fill or occupy the ports CP1, CP2, CP3, CP4, and the cable conductors 12A, 14A are covered by the cable insulation 12B, 14B, the risk of unintended intrusion into the housing 120 and contact with an electrically live component therein is substantially eliminated or reduced.

Figure 2:
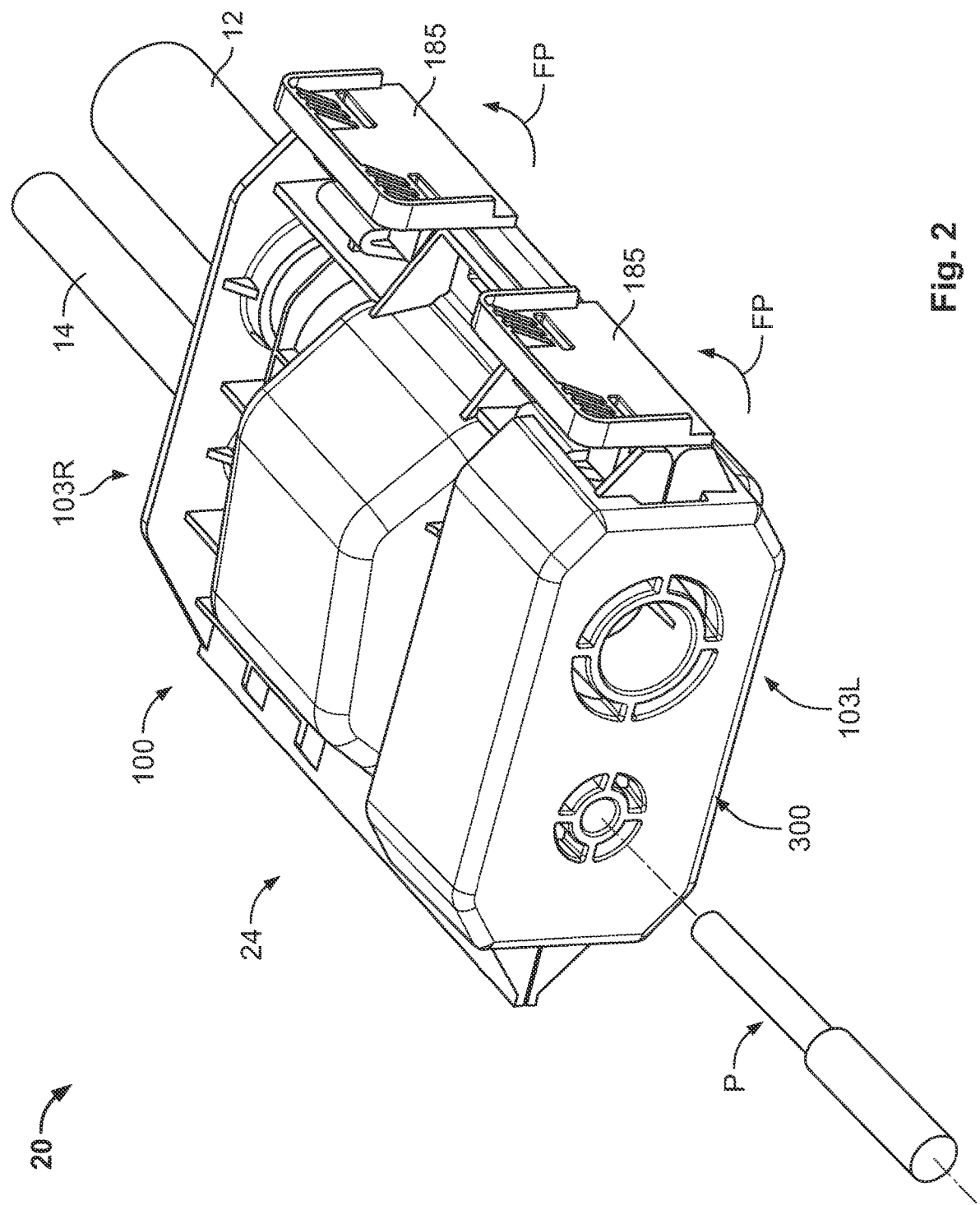
FIG. 2 is a perspective view of an enclosed connection assembly formed using the enclosed connection system of FIG. 1.
Figure 3:
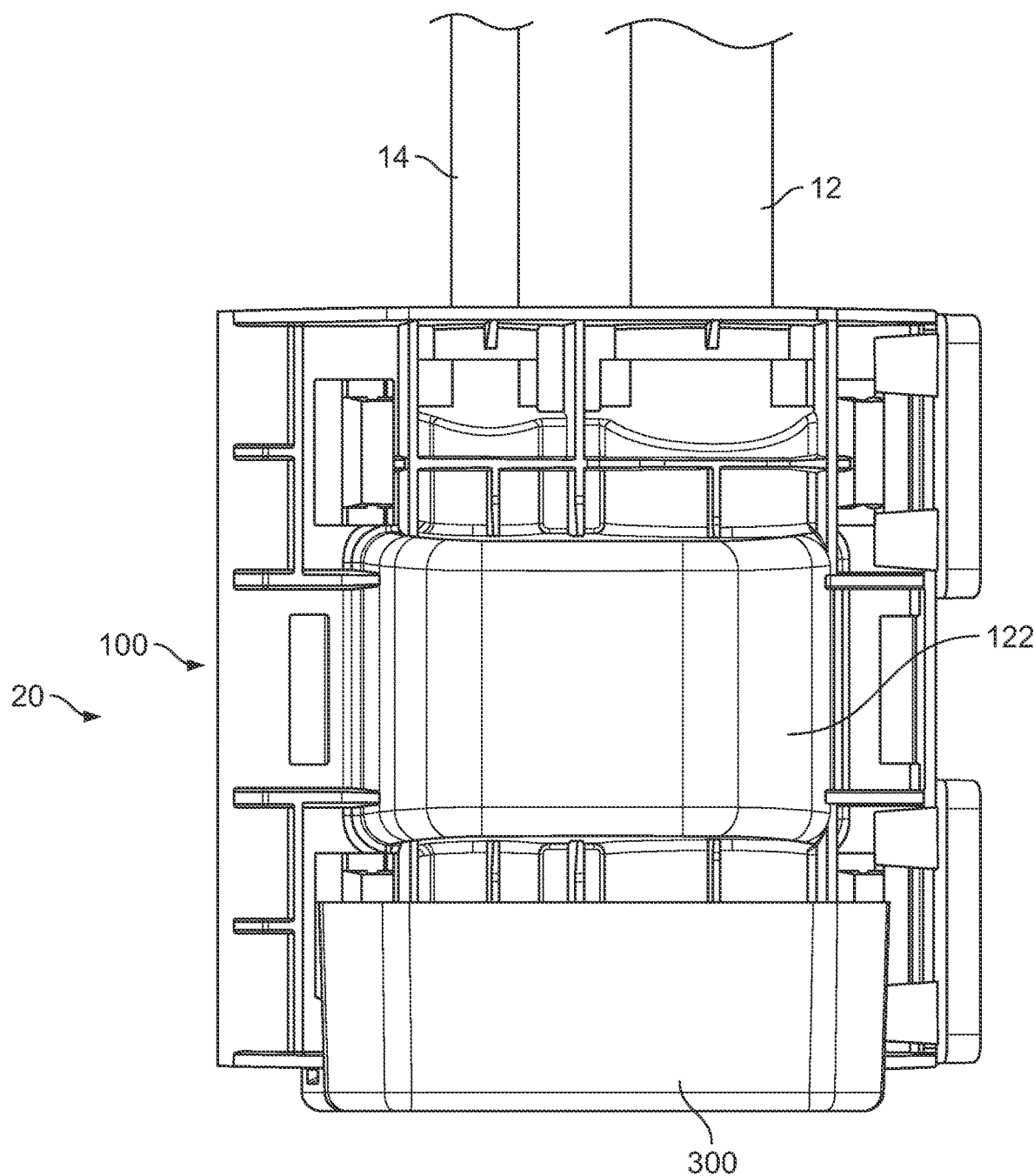
FIG. 3 is a top view of the enclosed connection assembly of FIG. 2.
Figure 6:
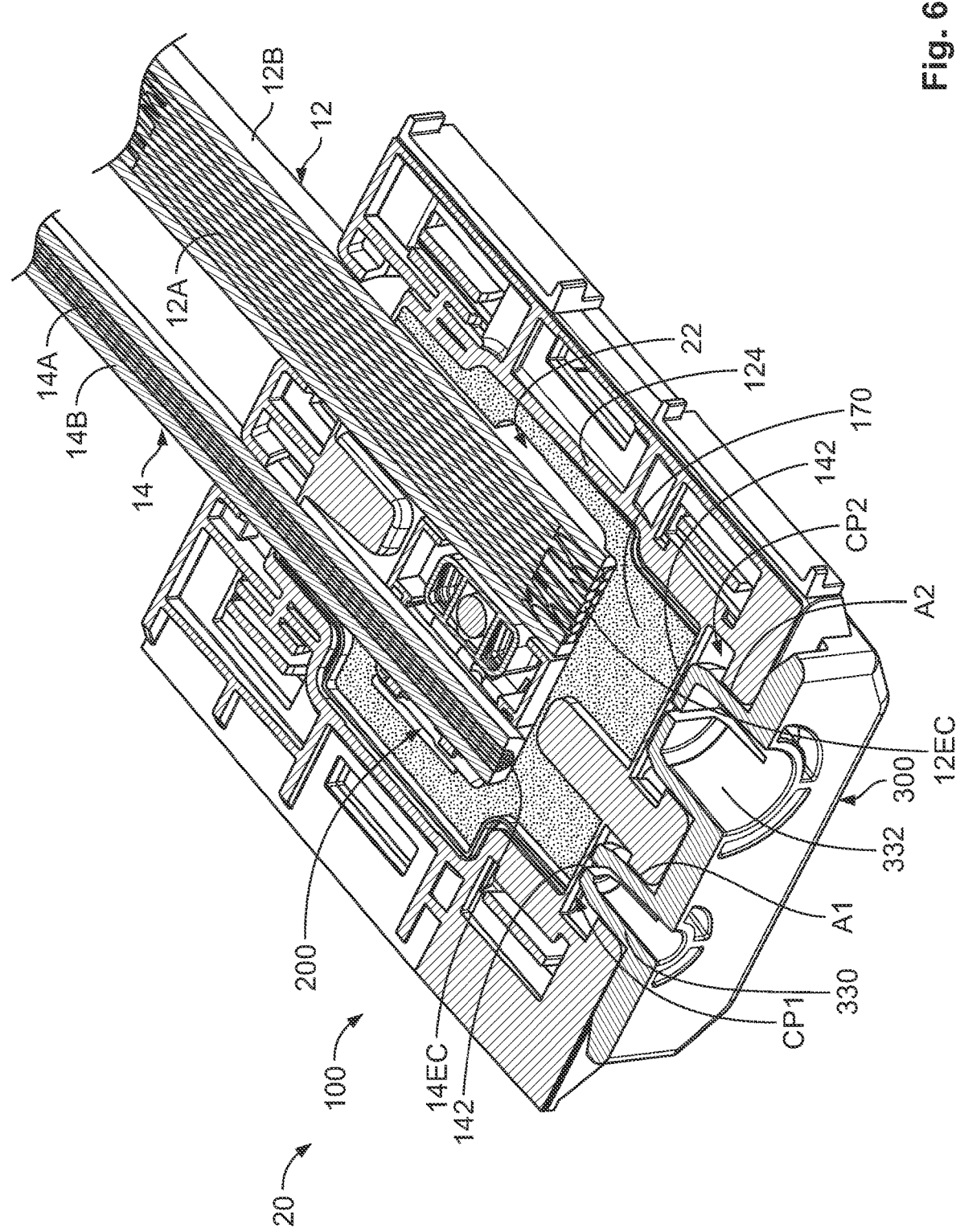
FIG. 6 is a perspective, cross-sectional view of the enclosed connection assembly of FIG. 2 taken along the line 6-6 of FIG. 5.

However, in some installations, the protected connection assembly 24 is mounted on the terminal ends 12E, 14E (FIGS. 6 and 13) of the cables 12, 14 (e.g., a main cable 12 and a tap cable 14). In this case, the terminal ends 12EC, 14EC of the cable conductors 12A, 14A are not covered by the cable insulations 12B, 14B, and the chamber ports CP1 and CP2 are not occupied by cables. This arrangement presents the risk that an object (e.g., a probe) may be inserted into the housing 120 through one of the chamber ports CP1, CP2 and make contact with a cable conductor 12A, 14A or an electrically live portion of the connector 200. FIG. 2 shows an illustrative or exemplary object P that may probe, intrude or attempt to intrude into the housing 120 through a chamber port CP1, CP2. Exemplary intrusive objects may include a tool (e.g., a screwdriver) or other objects small enough to fit through a chamber port CP1, CP2. It will be appreciated that, if the intruding object is electrically conductive, contact between the object and a cable conductor or the connector in the housing 120 may risk injury (e.g., electrocution) or other undesirable or damaging electrical transmission (which may result in damage to the electrical system).

The protective end cap 300 serves to prevent or inhibit unintended insertion of an object through either of the chamber ports CP1, CP2. In use, a user pushes the end cap 300 onto the closed enclosure assembly 100 in an end cap insertion direction I(FIG. 1) such that the insert features 330 and 332 are inserted into the enclosure port EP1 and the enclosure port EP2, respectively. More particularly, the insert feature 330 is inserted in to the access port A1 and the insert feature 332 is inserted into the access port A2. The end cap 300 (in particular, the insert features 330, 332) thereby block entry into the chamber ports CP1 and CP2.

Figure 7:
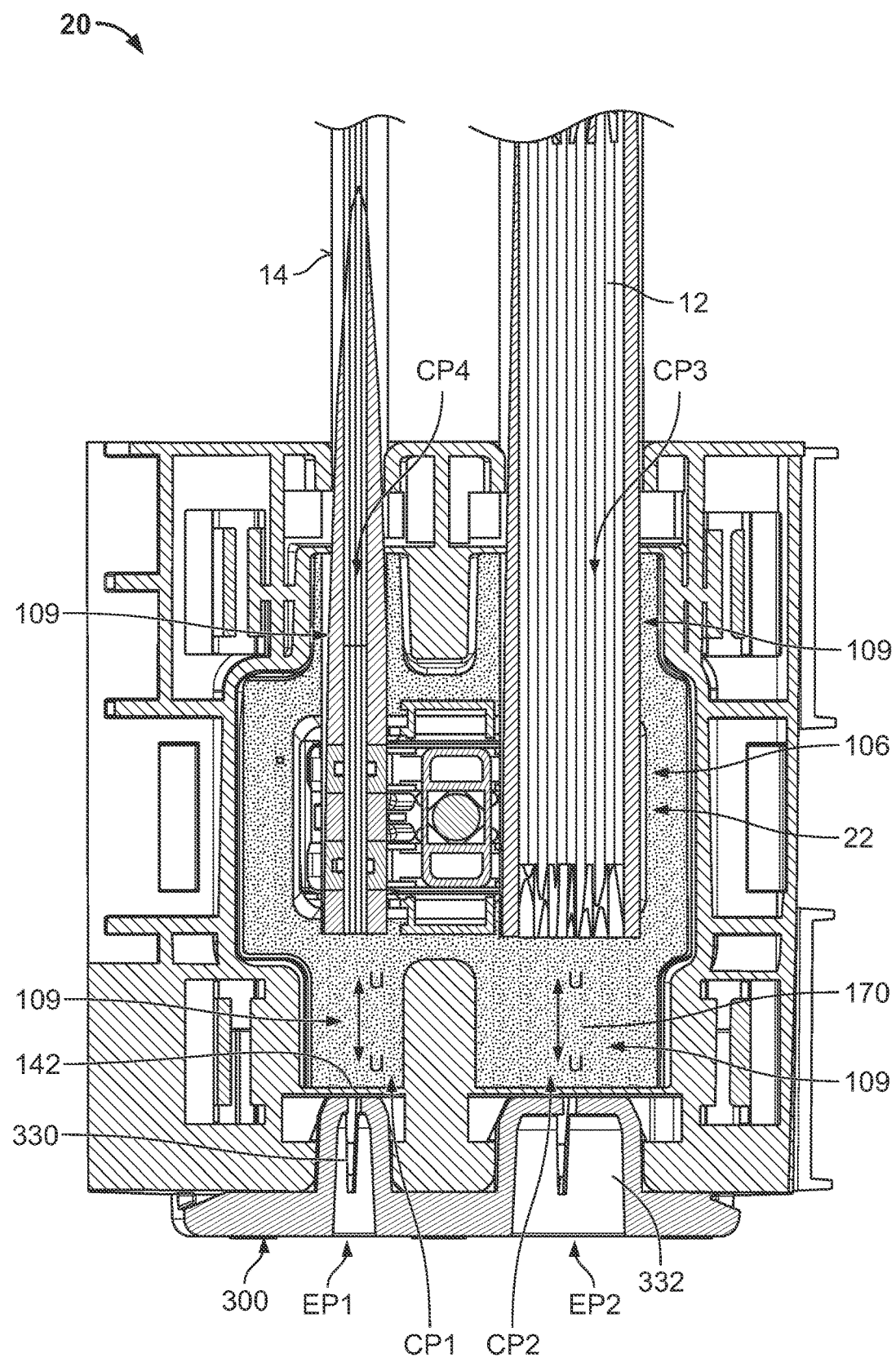
FIG. 7 is a top cross-sectional view of the enclosed connection assembly of FIG. 2 taken along the line 6-6 of FIG. 5.

Each insert feature 330, 332 slides along its axis P-P and the corresponding port axis U-U (FIG. 7). The outer diameter D20 of the barbs 358 of the insert portion 330 is greater than the inner diameter D21 (FIG. 26) of the corresponding access port A1. The outer diameter D22 (FIG. 26) of the barbs 358 of the insert portion 332 is greater than the inner diameter D23 (FIG. 26) of the corresponding access port A2. As a result, as the insert portions 330, 332 are slid into their access ports A1, A2, the legs 350 of each insert portion 330, 332 are deflected inward (in the converging directions DC; FIG. 27) until the barbs 358 clear the rear edge of the strain relief wall 152. The legs 350 are then permitted to resiliently return or snap back toward their relaxed positions (in return directions DR), thereby interlocking or latching the barbs 358 onto the inner surface or face 157 of the strain relief wall 152. The insert portions 330, 332 are thus locked in the access ports A1, A2 and thereby locked in the enclosure ports EP1, EP2. The end cap 300 is thereby interlocked, locked, anchored or secured onto the enclosure assembly 100 as shown in FIGS. 1-11.

In some embodiments and as shown, when the end cap 300 is mounted on the enclosure assembly 100 as described, the distal terminal end 330T of the insert portion 330 is disposed in the void 155 between the chamber port CP1 and the access port A1, so that the insert portion 330 does not displace or open the port wall 142 of the chamber port CP1. Similarly, the distal terminal end 332T of the insert portion 332 is disposed in the void 155 between the chamber port CP2 and the access port A2, so that the insert portion 332 does not displace or open the port wall 142 of the chamber port CP2. In this manner, the end cap 300 permits the port walls 142 of the chamber ports CP1, CP2 to remain closed and prevent or resist extrusion of the sealant out through the chamber ports CP1, CP2. In some embodiments, the distal terminal end 332T are located in contact with or closely adjacent their respective port walls 142. The distal terminal ends 330T, 332T may then reinforce the port walls 142 to also resist extrusion of the sealant out through the chamber ports CP1, CP2.

With the end cap 300 mounted on the enclosure assembly 100 as described, the insert portions 330, 332 are disposed in the access ports A1, A2 and plug the access ports A1, A2. The insert portions 330, 332 can thereby shield the chamber ports CP1, CP2 and occlude or block entry of an object or probe through the ports chamber ports CP1, CP2.

With the end cap 300 mounted on the enclosure assembly 100 as described, the base wall 310 covers portions of the side walls 132 and the port walls 142 of the housing 120. In particular, the base wall 310 covers the separation line or mating interface JL (FIG. 11) between the cover members 122, 124. The end cap 300 can thereby block or prevent an object or probe from being inserted between the cover members 122, 124 at this location.

Additionally, the side walls 312, 314 extend over the cover members 122, 124 in directions parallel to the end cap insertion direction I, and thereby wrap around the top and bottom of the housing 120. This arrangement can prevent insertion of an object or probe into a chamber port CP1, CP2 or into the chamber 106 through the interface JL from an angled or indirect direction. In particular, the side walls 312, 314 block access to the chamber ports CP1, CP2 from above or below through the void 155 between the port wall 142 and the strain relief wall 152. The geometric configuration of the end cap 300 with side walls 312, 314 can also reinforce the housing 120 to resist opening or deformation of the housing 120.

Figure 21:
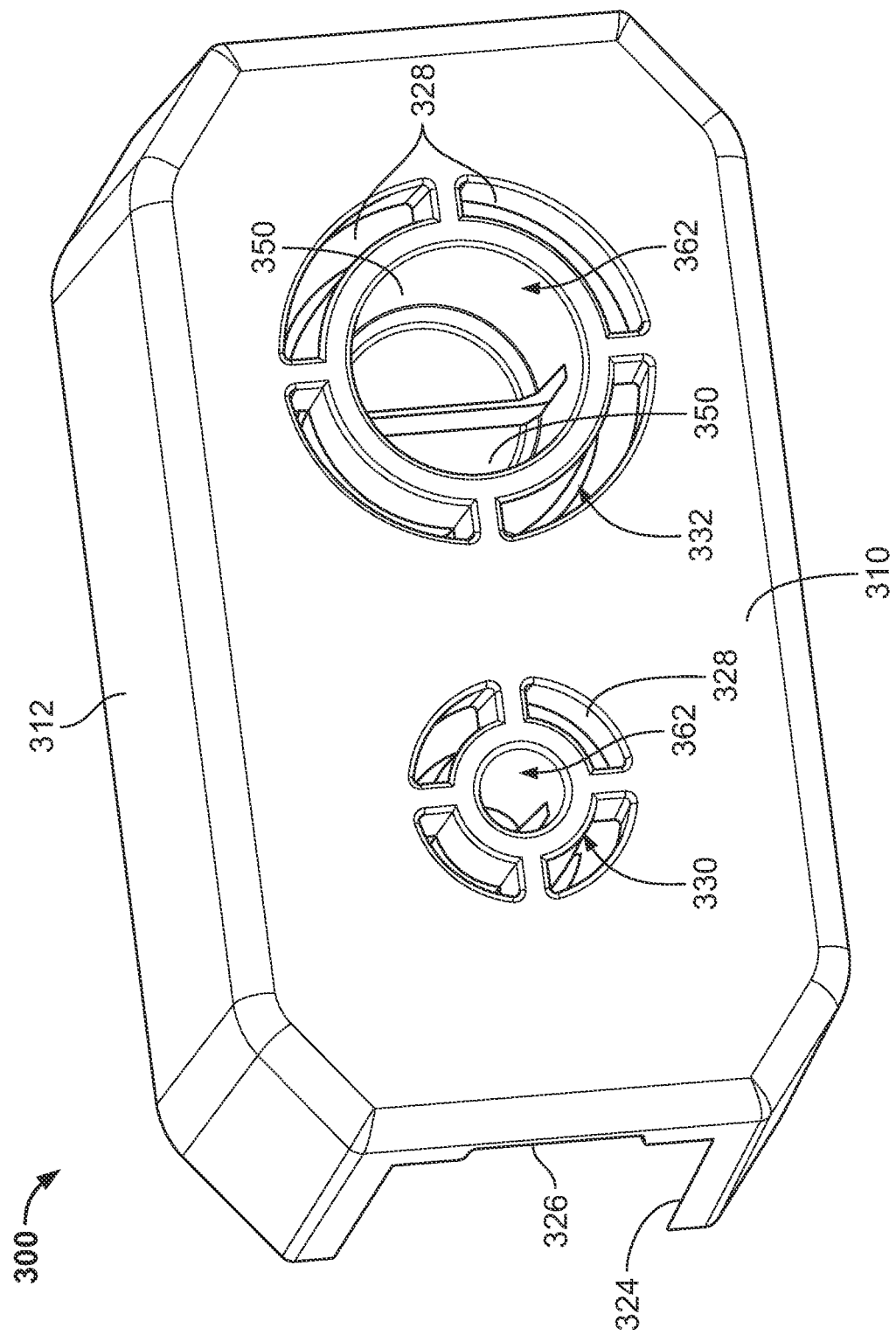
FIG. 21 is a front perspective view of the protective end cap of FIG. 1.
Figure 22:
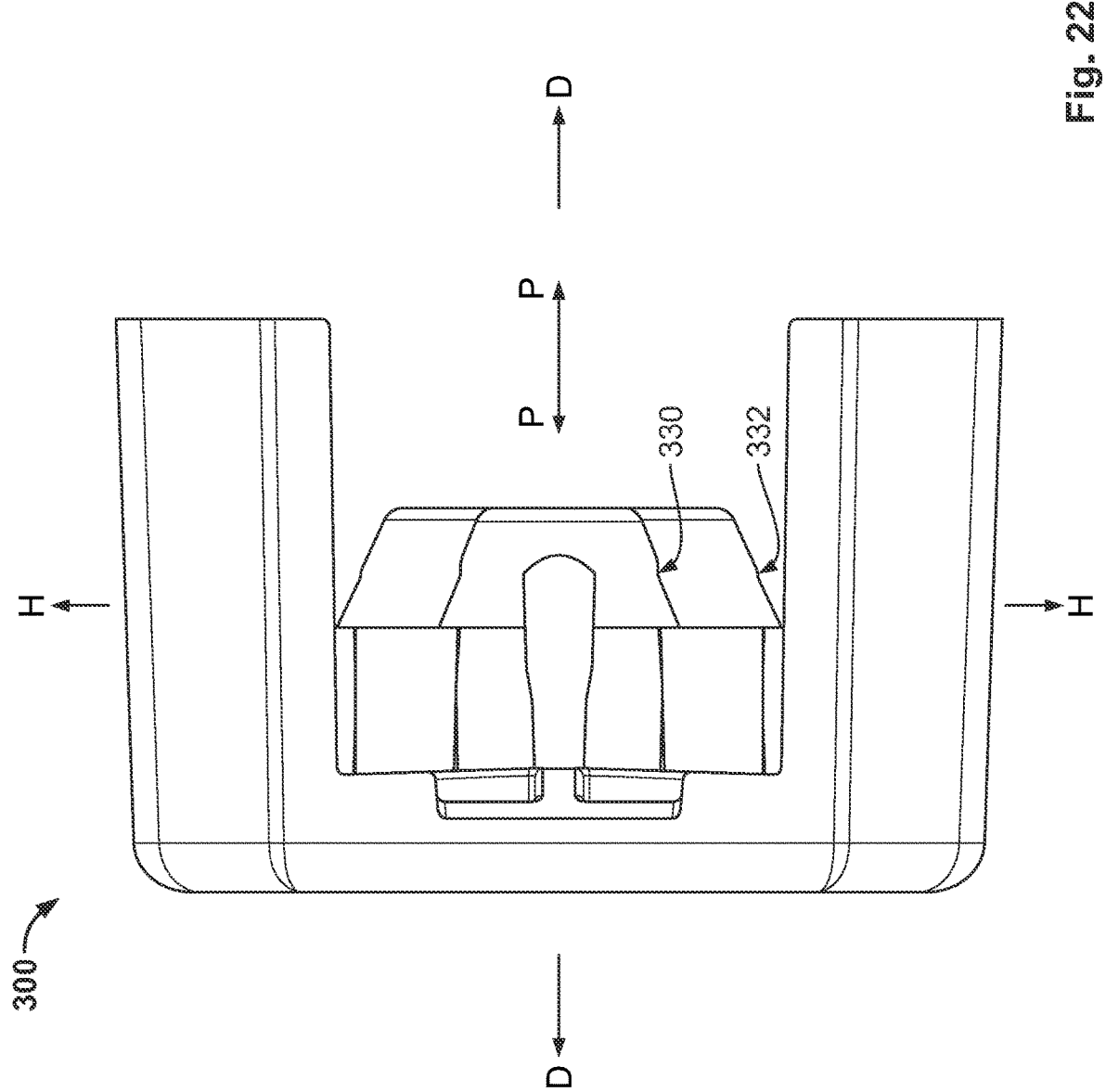
FIG. 22 is a side view of the protective end cap of FIG. 1.
Figure 23:
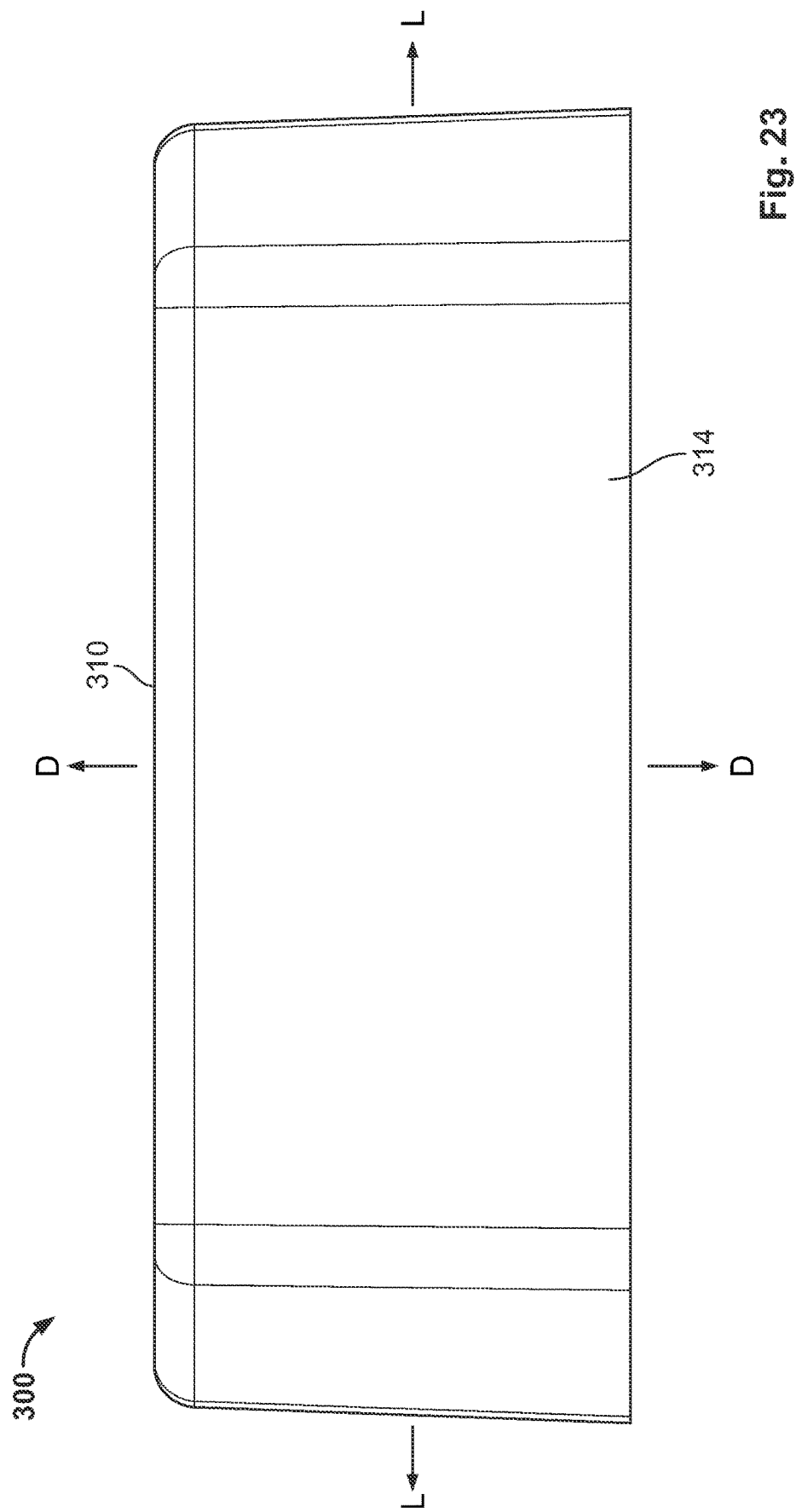
FIG. 23 is a top view of the protective end cap of FIG. 1.
Figure 24:
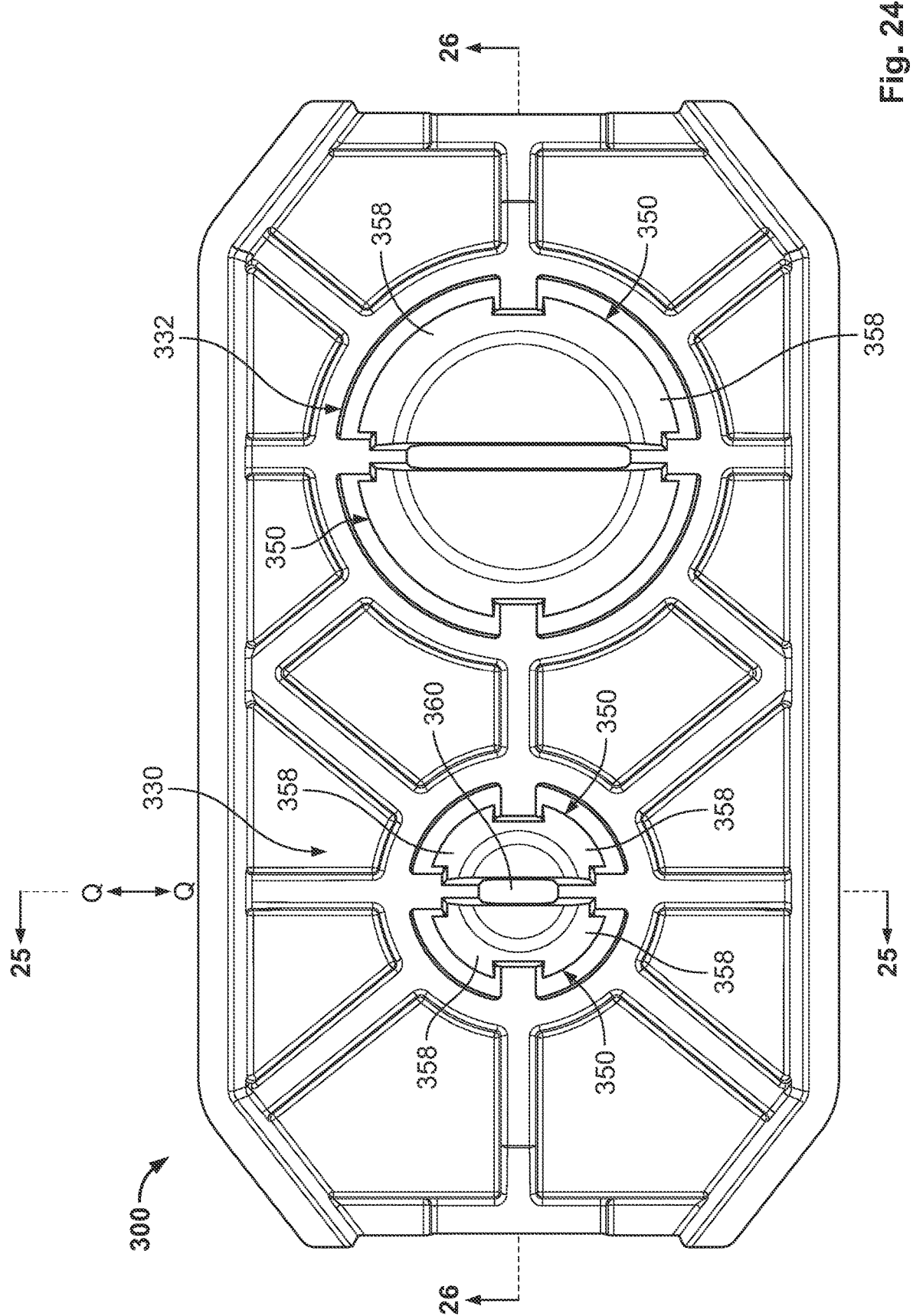
FIG. 24 is a rear view of the protective end cap of FIG. 1.

The housing 120 is configured such that the cover members 122 and 124 can be separated by relatively displacing either or both of them in separation directions N (FIG. 11) along a separation axis M-M. The separation directions N and axis M-M are generally perpendicular to the axis of the hinge 126 and the plane of the interface JL between the cover members 122, 124. The deflection axis V-V (FIGS. 9 and 28) of each insert portion is transverse to (and, in some embodiments and as shown, substantially perpendicular to) the separation directions N and axis M-M. That is, the return directions DR of the legs 350 (which are perpendicular to the slot axis Q-Q; FIG. 21) are transverse or perpendicular to the separation axis M-M.

As a result, forces applied by an inserted object or probe will be primarily directed in the directions DR. These forces are thereby resisted by the fixed wall portions of each cover member 122, 124 on either side of the insertion portion 330, 332 (i.e., the strain relief wall portions 152 adjacent each leg 350). If, on the other hand, the deflection axis V-V were instead oriented parallel with the separation axis M-M, force applied by a probe inserted into the cavity 362 would displace the legs 350 in the separation directions N. The housing 120 would provide less resistance to the opening of the legs 350, with the effect that the legs 350 may be more easily opened a sufficient distance to permit the probe to pass through the distal end of the insertion portion 330, 332.

Also, the orientation of the return directions DR tends to direct the spring return forces of the legs 350 perpendicular to the separation axis M-M. Any tendency of the spring return forces or a force applied by an inserted object or probe to force the cover members 122, 124 apart is thereby reduced.

Additionally, because of the orientation of the return directions DR, the interlocks between the barbs 358 and the strain relief walls 152 are less susceptible to dislodgement caused by deformation or displacement between the cover members 122, 124.

If desired, the end cap 300 can be removed from the enclosure assembly 100. A prying tool (e.g., a flat head screwdriver) can be inserted in the pry slots 326 and used to pry the end cap 300 off.

When the sealant 160, 170 is a gel, the cables 12, 14 and the housing 120 may apply a compressive force to the sealant 160, 170 as the assembly 100 is transitioned from the open position to the closed position. The gel may thereby be elongated and be generally deformed and substantially conform to the outer surfaces of the connector 200, the cables 12, 14 and to the inner surface of the housing 120. Some shearing of the gel may occur as well. At least some of the gel deformation may be elastic. The restoring force in the gel resulting from this elastic deformation generally causes the gel to operate as a spring exerting an outward force between the housing 120 and the connector 200 and the cables 12, 14. The compressive loading and restoring force are maintained by the closure of the cover members 122, 124.

Various properties of the gel as described above may ensure that the gel sealant 160, 170 maintains a reliable and long lasting seal between the housing 120 and the connector 200 and the cables 12, 14. The elastic memory of and the retained or restoring force in the elongated, elastically deformed gel generally cause the gel to bear against the mating surfaces of the connector 200, the cables 12, 14 and the interior surface of the housing 120. Also, the tack of the gel may provide adhesion between the gel and these surfaces. The gel, even though it is cold-applied, is generally able to flow about the connector 200, the cables 12, 14 and the housing 120 to accommodate their irregular geometries.

According to some embodiments, the sealant 160, 170 is a self-healing or self-amalgamating gel. This characteristic, combined with the aforementioned compressive force between the connector 200, cables 12, 14 and the housing 120, may allow the sealant 160, 170 to re-form into a continuous body if the gel is sheared by the insertion of the cables 12, 14 into the enclosure assembly 100. The gel may also re-form if the connector 200 and cables 12, 14 are withdrawn from the gel.

The sealant 160, 170, particularly when formed of a gel as described herein, may provide a reliable moisture barrier for the cables 12, 14 and the connector 200, even when the enclosure assembly 100 is subjected to extreme temperatures and temperature changes. The housing 120 may be made from an abrasion resistant material that resists being punctured by the abrasive forces.

The gel sealant may also serve to prevent or inhibit corrosion of the connection 22 by depositing a layer of oil from the gel on the exposed surfaces of the connector 200 and conductor portions 12A, 14A in the enclosure cavity 106. Even if the gel is removed from the connection 22, the oil may remain to coat the connection surfaces as a barrier to moisture.

As will be appreciated from the description herein, enclosure assemblies according to the present invention may be provided as pre-formed and fully assembled units, with pre-cured gel or other sealant therein as described above, that may be cold applied about a connection to form a seal.

While, in accordance with some embodiments, the housing 120 is integrally and unitarily formed, the housing may be otherwise formed in accordance with some aspects of invention. For example, the cover members 122, 124 and/or the hinge 126 may be separate parts joined together in hinged fashion or otherwise. For example, the cover members 122, 124 may be separate pieces secured together by tie wraps, snaps, latches or the like and/or not hinged.

According to some embodiments, an enclosure assembly 100 as described herein may be formed without the sealant voids 164, 174 (i.e., the cover members 122, 124 are solid filled up to a desired level).

In other embodiments, a connector system and method as described herein may include a different type of electrical connector in place of an IPC connector 200. Such other type of electrical connector may be an IPC connector of a different design or a non-insulation piercing connector.

According to some embodiments, a housing and protective end cap as disclosed herein (e.g., the housing 120) may be used to enclose a connection including an IPC connector (e.g., the connection 22) or other type of connector (e.g., a non-IPC connector) without the provision of sealant (e.g., the sealants 160, 170) therein. Such a sealant-free housing may provide touch protection.

According to some embodiments, the enclosure assembly 100, the connector 200, and the protective end cap 300 are pre-configured or packaged as a matched kit. However, the enclosure assembly 100 and the connector 200 need not be provided as a kit. For example, the enclosure assembly 100 and the protective end cap 300 may be retrofitted onto a connector 200 that has been previously installed, even years prior.

According to some embodiments, the cables 12, 14 are power transmission conductors. According to some embodiments, the cables 12, 14 are aerial power transmission conductors. According to some embodiments, the cable 12 is a main line electrical conductor cable and the cable 14 is a tap line electrical conductor cable.

According to some embodiments, the protected connection assembly 24 is compliant with Underwriters Laboratory Standard UL6703 (Edition date 2011 Aug. 2). According to some embodiments, the protected connection assembly 24 can be buried directly underground (without provision of an additional enclosure) in compliance with Underwriters Laboratory Standard UL486D (Edition date 2015 Jun. 19).

It will be appreciated that enclosures in accordance with the present invention may have components (e.g., cover members, walls, etc.) and cavities or chambers having shapes, configurations and/or sizes different than those shown and described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosed connection system for mechanically and electrically connecting first and second cables each including an elongate electrical conductor covered by an insulation layer, the enclosed connection system comprising:
    an electrical connector configured to form a connection with the first and second cables wherein the conductors of the first and second cables are electrically connected by the electrical connector;
    an enclosure configured to be installed about the connection after the connection has been formed, such that the enclosure covers the connection and protects the electrical connector, the enclosure including a plurality of enclosure ports each configured to receive a cable; and
    a protective end cap configured to selectively cover at least a selected one of the enclosure ports; wherein the electrical connector is an insulation piercing connector including: at least one electrically conductive piercing member; and a clamping mechanism configured and operable to force the at least one piercing member through the insulation layers of the first and second cables and into electrical engagement with the conductors of the first and second cables to form the connection.

2. The enclosed connection system of claim 1 wherein:
the protective end cap includes an insert feature; and
the protective end cap is configured to be mounted on the enclosure such that the insert feature plugs the selected enclosure port.

3. The enclosed connection system of claim 2 wherein:
the protective end cap includes a second insert feature; and
the protective end cap is configured to be mounted on the enclosure such that the second insert feature plugs a second one of the enclosure ports.

4. The enclosed connection system of claim 1 wherein:
the protective end cap includes an insert feature;
the enclosure includes at least one cover member configurable to define an enclosure cavity to receive the electrical connector and the first and second cables;
the selected enclosure port includes an access port, a chamber port between the access port and the enclosure cavity, and a void defined between the access port and the chamber port; and
the protective end cap is configured to be mounted on the enclosure such that the insert feature extends through the access port and into the void.

5. The enclosed connection system of claim 4 wherein:
the insert feature has a distal terminal end; and
the protective end cap is configured to be mounted on the enclosure such that the distal terminal end is located in the void and between the chamber port and the access port.

6. The enclosed connection system of claim 5 wherein:
the enclosure includes a frangible port wall extending across the chamber port; and
the protective end cap is configured to be mounted on the enclosure such that the distal terminal end is located in the void and between the frangible port wall and the access port.

7. The enclosed connection system of claim 6 including a flowable sealant disposed in the enclosure cavity to provide a seal about the electrical connector.

8. The enclosed connection system of claim 4 wherein:
the enclosure includes a strain relief wall;
the access port is defined in the strain relief wall; and
the insert feature includes an integral latch feature configured to interlock with the strain relief wall to secure the protective end cap to the enclosure.

9. The enclosed connection system of claim 1 wherein:
the enclosure includes first and second cover members defining first and second cover member cavities, respectively;
the first and second cover members are pivotally connected by a hinge;

the first and second cover members are relatively pivotable about the hinge between an open position to receive the connection and a closed position wherein the first and second cover members define an enclosure cavity to contain the connection such that the electrical connector is encapsulated in the first and second cover members;

the protective end cap includes an insert feature;

the protective end cap includes opposed side walls;

the protective end cap is configured to be mounted on the enclosure such that:
 the insert feature is received through the selected enclosure port; and
 the opposed side walls overlap the first and second cover members and thereby resist displacement of the first and second cover members from the closed position toward the open position.

10. The enclosed connection system of claim 1 wherein:
the enclosure includes first and second cover members defining first and second cover member cavities, respectively;
the first and second cover members are pivotally connected by a hinge;
the first and second cover members are relatively pivotable about the hinge between an open position to receive the connection and a closed position wherein the first and second cover members define an enclosure cavity to contain the connection such that the electrical connector is encapsulated in the first and second cover members;
the protective end cap includes an insert feature having a latch feature, the latch feature including opposing legs that are relatively deflectable along a deflection axis;
the protective end cap is configured to be mounted on the enclosure such that:
 the insert feature is received through the selected enclosure port; and
 the deflection axis extends transversely to a separation axis of the first and second cover members.

11. The enclosed connection system of claim 1 wherein the enclosure includes:
at least one cover member configurable to define an enclosure cavity to receive the electrical connector; and
a flowable sealant disposed in the at least one cover member to provide a seal about the electrical connector.

12. The enclosed connection system of claim 11 wherein the sealant is a gel.

13. The enclosed connection system of claim 11 wherein the enclosure includes:
first and second cover members defining first and second cover member cavities, respectively; and
a first flowable sealant disposed in the first cover member cavity and a second flowable sealant disposed in the second cover member cavity;
wherein the first and second cover members are relatively movable between an open position to receive the connection and a closed position wherein the first and second cover members define the enclosure cavity to contain the connection such that the electrical connector is encapsulated in the first and second sealants; and
wherein the enclosure is configured such that the electrical connector will displace the first and second sealants when the first and second cover members are moved from the open position to the closed position about the electrical connector.

14. The enclosed connection system of claim 13 wherein the first and second sealants are first and second gels adapted to be elongated and elastically deformed in the closed position when the electrical connector is disposed in the enclosure cavity.

15. The enclosed connection system of claim 13 wherein:
the electrical connector has a connector volume;
the first and second sealants include first and second voids, respectively, pre-defined therein to receive the electrical connector, the first and second voids having a first void volume and a second void volume, respectively; and
the sum of the first void volume and the second void volume is less than the connector volume.

16. The enclosed connection system of claim 1 wherein:
the electrical connector is an insulation piercing connector including:
 at least one electrically conductive piercing member; and
 a clamping mechanism configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member;
the protective end cap includes an insert feature having a distal terminal end;
the enclosed connection includes a flowable sealant disposed in the enclosure cavity to provide a seal about the insulation piercing connector;
the enclosure includes at least one cover member configurable to define an enclosure cavity to receive the insulation piercing connector and the first and second cables;
the selected enclosure port includes an access port, a chamber port between the access port and the enclosure cavity, and a void defined between the access port and the chamber port;
the enclosure includes a frangible port wall extending across the chamber port;
the protective end cap is configured to be mounted on the enclosure such that:
 the insert feature plugs the selected enclosure port and extends through the access port and into the void; and
 the distal terminal end is located in the void and between the frangible port wall and the access port;
the enclosure includes a strain relief wall;
the access port is defined in the strain relief wall; and
the insert feature includes an integral latch feature configured to interlock with the strain relief wall to secure the protective end cap to the enclosure.

17. A method for forming an enclosed connection assembly about first and second cables each including an elongate electrical conductor covered by an insulation layer, the method comprising:
connecting the first and second cables with an electrical connector to form a connection wherein the conductors of the first and second cables are electrically connected by the electrical connector; thereafter
enclosing the connection in an enclosure to protect the electrical connector, wherein the enclosure includes a plurality of enclosure ports each configured to receive a cable; and
covering at least a selected one of the enclosure ports with a protective end cap;

wherein the electrical connector is an insulation piercing connector including: at least one electrically conductive piercing member; and a clamping mechanism configured and operable to force the at least one piercing member through the insulation layers of the first and second cables and into electrical engagement with the conductors of the first and second cables to form the connection.

18. An enclosed connection system for mechanically and electrically connecting first and second cables each including an elongate electrical conductor covered by an insulation layer, the enclosed connection system comprising:
an electrical connector configured to form a connection with the first and second cables wherein the conductors of the first and second cables are electrically connected by the electrical connector;
an enclosure configured to receive and cover the connection and to protect the electrical connector, the enclosure including a plurality of enclosure ports each configured to receive a cable; and
a protective end cap configured to selectively cover at least a selected one of the enclosure ports;
wherein:
the protective end cap includes an insert feature;
the enclosure includes at least one cover member configurable to define an enclosure cavity to receive the electrical connector and the first and second cables;
the selected enclosure port includes an access port, a chamber port between the access port and the enclosure cavity, and a void defined between the access port and the chamber port;
the protective end cap is configured to be mounted on the enclosure such that the insert feature extends through the access port and into the void;
the enclosure includes a strain relief wall;
the access port is defined in the strain relief wall; and
the insert feature includes an integral latch feature configured to interlock with the strain relief wall to secure the protective end cap to the enclosure.

19. The enclosed connection system of claim 18 wherein:
the electrical connector is an insulation piercing connector including:
at least one electrically conductive piercing member; and
a clamping mechanism configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member;
the protective end cap includes an insert feature having a distal terminal end;
the enclosed connection includes a flowable sealant disposed in the enclosure cavity to provide a seal about the insulation piercing connector;
the enclosure includes a frangible port wall extending across the chamber port; and
the protective end cap is configured to be mounted on the enclosure such that the distal terminal end is located in the void and between the frangible port wall and the access port.

20. An enclosed connection system for mechanically and electrically connecting first and second cables each including an elongate electrical conductor covered by an insulation layer, the enclosed connection system comprising:
an electrical connector configured to form a connection with the first and second cables wherein the conductors of the first and second cables are electrically connected by the electrical connector;
an enclosure configured to receive and cover the connection and to protect the electrical connector, the enclosure including a plurality of enclosure ports each configured to receive a cable; and
a protective end cap configured to selectively cover at least a selected one of the enclosure ports;
wherein:
the enclosure includes first and second cover members defining first and second cover member cavities, respectively;
the first and second cover members are pivotally connected by a hinge;
the first and second cover members are relatively pivotable about the hinge between an open position to receive the connection and a closed position wherein the first and second cover members define an enclosure cavity to contain the connection such that the electrical connector is encapsulated in the first and second cover members;
the protective end cap includes an insert feature;
the protective end cap includes opposed side walls;
the protective end cap is configured to be mounted on the enclosure such that:
the insert feature is received through the selected enclosure port; and
the opposed side walls overlap the first and second cover members.

21. The enclosed connection system of claim 20 wherein the protective end cap is configured to be mounted on the enclosure such that the opposed side walls overlap the first and second cover members and thereby resist displacement of the first and second cover members from the closed position toward the open position.

22. The enclosed connection system of claim 20 wherein:
the selected enclosure port includes an access port, a chamber port between the access port and the enclosure cavity, and a void defined between the access port and the chamber port;
the protective end cap is configured to be mounted on the enclosure such that the insert feature extends through the access port and into the void; and
the protective end cap is configured to be mounted on the enclosure such that the opposed side walls overlap the first and second cover members and thereby block access to the enclosure cavity through the void.

23. An enclosed connection system for mechanically and electrically connecting first and second cables each including an elongate electrical conductor covered by an insulation layer, the enclosed connection system comprising:
an electrical connector configured to form a connection with the first and second cables wherein the conductors of the first and second cables are electrically connected by the electrical connector;
an enclosure configured to receive and cover the connection and to protect the electrical connector, the enclosure including a plurality of enclosure ports each configured to receive a cable; and
a protective end cap configured to selectively cover at least a selected one of the enclosure ports;

wherein:
   the enclosure includes first and second cover members defining first and second cover member cavities, respectively;
   the first and second cover members are pivotally connected by a hinge;
   the first and second cover members are relatively pivotable about the hinge between an open position to receive the connection and a closed position wherein the first and second cover members define an enclosure cavity to contain the connection such that the electrical connector is encapsulated in the first and second cover members;
   the protective end cap includes an insert feature having a latch feature, the latch feature including opposing legs that are relatively deflectable along a deflection axis;
   the protective end cap is configured to be mounted on the enclosure such that:
      the insert feature is received through the selected enclosure port; and
      the deflection axis extends transversely to a separation axis of the first and second cover members.

\* \* \* \* \*